US011422311B2

(12) United States Patent
Verheyden et al.

(10) Patent No.: US 11,422,311 B2
(45) Date of Patent: Aug. 23, 2022

(54) FIBER OPTIC CONNECTOR WITH FIBER END PROTECTION

(71) Applicants: CommScope Connectivity Belgium BVBA, Kessel-Lo (BE); CommScope Technologies LLC, Hickory, NC (US)

(72) Inventors: Danny Willy August Verheyden, Gelrode (BE); Marc Eugène Willem Bervoets, Hasselt (BE); Robert Charles Flaig, Lancaster, PA (US); Randall Bobby Paul, Elizabethville, PA (US); Michael Ward Zitsch, Carlisle, PA (US); David Donald Erdman, Hummelstown, PA (US); Gregory J. Schaible, Lakeville, MN (US)

(73) Assignees: CommScope Connectivity Belgium BVBA, Kessel-Lo (BE); CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/895,776

(22) Filed: Jun. 8, 2020

(65) Prior Publication Data
US 2020/0310038 A1    Oct. 1, 2020

Related U.S. Application Data

(63) Continuation of application No. 15/670,257, filed on Aug. 7, 2017, now abandoned, which is a
(Continued)

(51) Int. Cl.
*G02B 6/38* (2006.01)

(52) U.S. Cl.
CPC ......... *G02B 6/3809* (2013.01); *G02B 6/3825* (2013.01); *G02B 6/3849* (2013.01)

(58) Field of Classification Search
None
See application file for complete search history.

(56) References Cited

U.S. PATENT DOCUMENTS 4,046,454 A * 9/1977 Pugh, III ............. G02B 6/3636
                                                         385/59
4,047,796 A    9/1977 Kao et al.
(Continued)

FOREIGN PATENT DOCUMENTS

EP    0969298 A1    1/2000
EP    1148366 A2    10/2001
(Continued)

OTHER PUBLICATIONS

International Search Report and Written Opinion for Application No. PCT/US2015/065884 dated Apr. 22, 2016.
(Continued)

*Primary Examiner* — Rhonda S Peace
(74) *Attorney, Agent, or Firm* — Merchant & Gould P.C.

(57) ABSTRACT

The present disclosure relates to fiber optic connection systems including fiber optic connector having retractable noses for protecting bare fiber ends of ferrule-less connectors. In certain examples, the retractable noses are used in combination with protective shutters. In other examples, the retractable noses can accommodate multiple optical fibers.

20 Claims, 23 Drawing Sheets

Related U.S. Application Data continuation of application No. 14/971,444, filed on Dec. 16, 2015, now Pat. No. 9,759,869.

(60) Provisional application No. 62/092,315, filed on Dec. 16, 2014.

(56) References Cited

U.S. PATENT DOCUMENTS

| | | | |
|---|---|---|---|
| 4,102,561 A | | 7/1978 | Hawk |
| 4,218,113 A | | 8/1980 | Uberbacher |
| 4,634,216 A | | 1/1987 | Calevo et al. |
| 4,824,197 A | | 4/1989 | Patterson |
| 4,871,227 A | * | 10/1989 | Tilse ................. G02B 6/3806 385/55 |
| 5,125,056 A | | 6/1992 | Hughes et al. |
| 5,379,362 A | | 1/1995 | Kawamura |
| 5,727,101 A | | 3/1998 | Giebel et al. |
| 6,132,105 A | | 10/2000 | Konda |
| 6,142,676 A | | 11/2000 | Lu |
| 6,259,856 B1 | * | 7/2001 | Shahid ............... G02B 6/3879 385/147 |
| 6,352,372 B1 | * | 3/2002 | Shahid ............... G02B 6/3879 385/136 |
| 6,364,539 B1 | | 4/2002 | Shahid |
| 6,491,442 B1 | | 12/2002 | Murakami et al. |
| 6,550,978 B2 | | 4/2003 | De Marchi |
| 6,678,442 B2 | | 1/2004 | Gall et al. |
| 6,766,086 B1 | | 7/2004 | Sherman et al. |
| 6,779,931 B2 | | 8/2004 | Murata et al. |
| 6,817,777 B1 | | 11/2004 | Grabbe |
| 6,826,347 B2 | * | 11/2004 | Matsumoto ......... G02B 6/3676 385/137 |
| 7,077,577 B2 | | 7/2006 | Trezza et al. |
| 7,283,718 B2 | | 10/2007 | Zaina |
| 7,559,700 B2 | | 7/2009 | Eguchi et al. |
| 7,641,397 B2 | | 1/2010 | Koreeda et al. |
| 8,087,833 B2 | | 1/2012 | Fantini |
| 8,317,407 B2 | | 11/2012 | Hioki |
| 8,582,945 B2 | | 11/2013 | Duis et al. |
| 8,858,091 B2 | | 10/2014 | Koreeda |
| 8,985,867 B2 | | 3/2015 | Michael |
| 9,151,908 B2 | | 10/2015 | Yoshizaki |
| 9,575,263 B2 | | 2/2017 | Gurreri et al. |
| 9,759,869 B2 | | 9/2017 | Verheyden et al. |
| 10,908,366 B2 | * | 2/2021 | Zimmel ............... G02B 6/3806 |
| 11,048,051 B2 | * | 6/2021 | Verheyden ........... G02B 6/3636 |
| 2003/0174998 A1 | | 9/2003 | Shevchuk |
| 2004/0086239 A1 | | 5/2004 | Rosenberg et al. |
| 2009/0269014 A1 | | 10/2009 | Winberg et al. |
| 2013/0183001 A1 | | 7/2013 | Ott |
| 2014/0010499 A1 | * | 1/2014 | Suematsu ............ G02B 6/3881 385/65 |
| 2014/0072265 A1 | | 3/2014 | Ott |
| 2015/0362681 A1 | | 12/2015 | Watte et al. |
| 2015/0378109 A1 | | 12/2015 | Samal et al. |
| 2016/0170152 A1 | | 6/2016 | Verheyden et al. |
| 2018/0024301 A1 | | 1/2018 | Verheyden et al. |

FOREIGN PATENT DOCUMENTS

| | | | | |
|---|---|---|---|---|
| EP | 1237020 A2 | | 9/2002 | |
| EP | 2549314 A1 | | 1/2013 | |
| WO | 8300935 A1 | | 3/1938 | |
| WO | WO-9206396 A1 | * | 4/1992 | ........... G02B 6/3839 |
| WO | 02082127 A2 | | 10/2002 | |
| WO | 2012112343 A1 | | 8/2012 | |
| WO | 2013/036843 A2 | | 3/2013 | |
| WO | 2013117598 A2 | | 8/2013 | |
| WO | 2014118225 A1 | | 8/2014 | |
| WO | 2016043922 A1 | | 3/2016 | |
| WO | WO-2020112645 A1 | * | 6/2020 | ........... G02B 6/3806 |

OTHER PUBLICATIONS

Product Information, "Information About Dow Corning Brand Connector Seal Grommets and Sealing Strips," Dow Corning, http://www.milar.pl/media/!downloads/Download-connector-seals-sealing-strips.pdf, 8 pages (Copyright 2003, 2004, 2005).

Extended European Search Report for Application No. 15870903.0 dated Jul. 19, 2018.

* cited by examiner

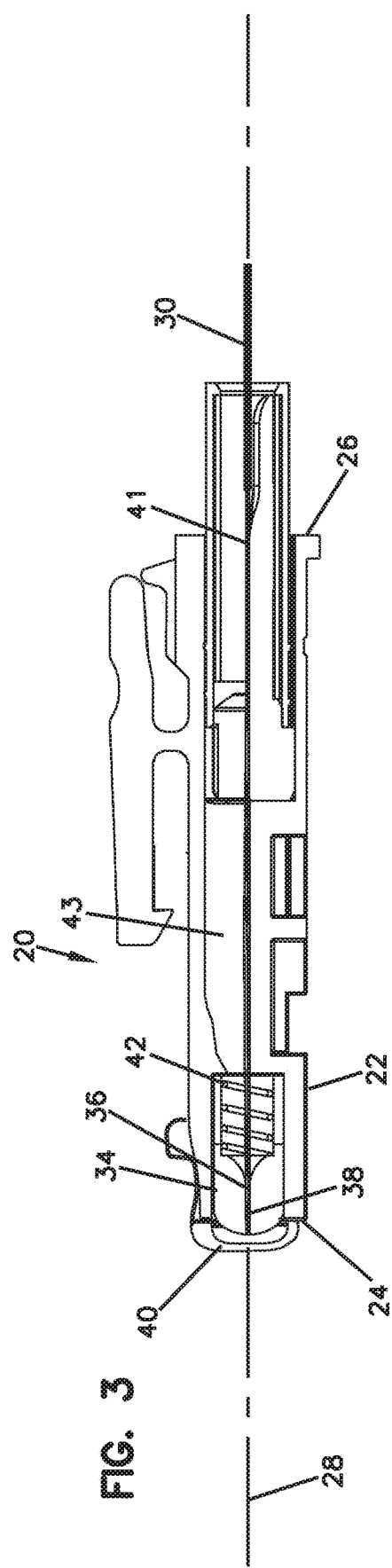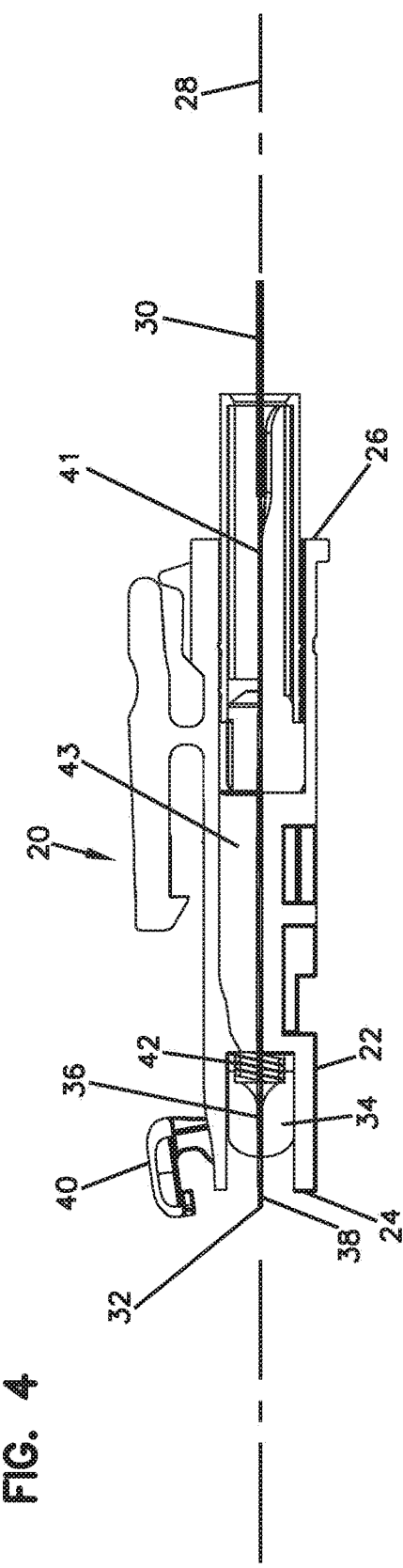

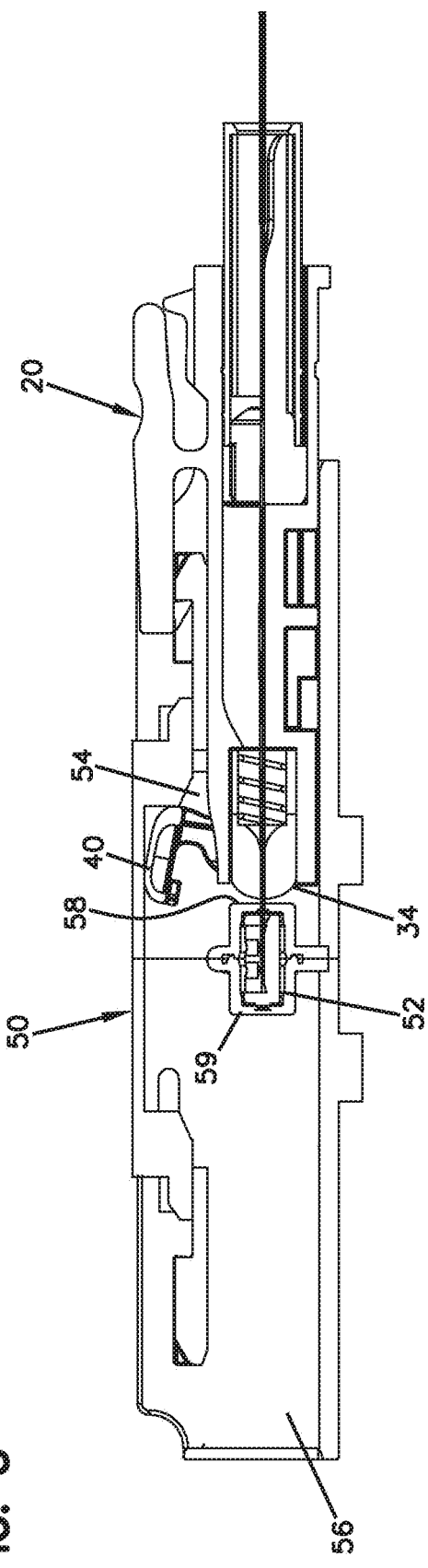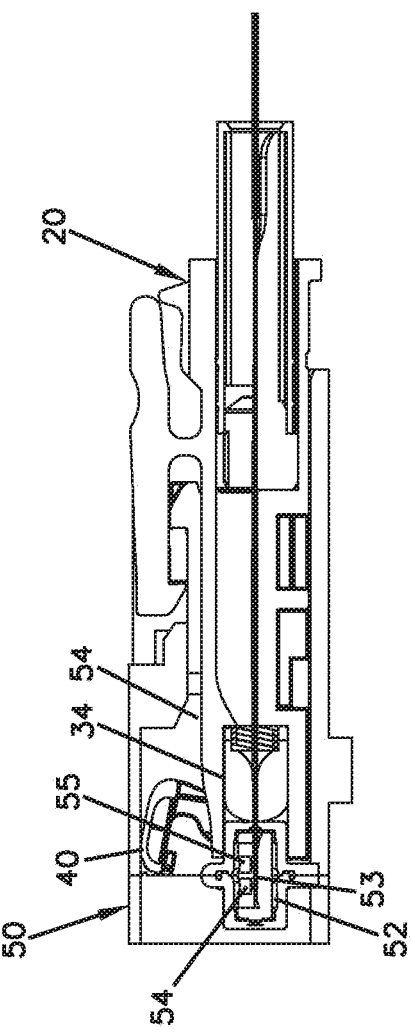
FIG. 5
FIG. 6

FIBER OPTIC CONNECTOR WITH FIBER END PROTECTION

CROSS REFERENCE TO RELATED APPLICATIONS

This application is a continuation of application Ser. No. 15/670,257, filed Aug. 7, 2017, which is a continuation of application Ser. No. 14/971,444 filed Dec. 16, 2015, now U.S. Pat. No. 9,759,869, which claims the benefit of provisional application Ser. No. 62/092,315, filed Dec. 16, 2014, which applications are incorporated herein by reference in their entirety.

BACKGROUND

Optical adapters are used to optically couple together optical fiber tips of optical connectors. The optical adapters include alignment structure that aligns the fiber tips to enable the transfer of optical signals therebetween. Optical connectors can be secured to the optical adapters when received at the ports of the optical adapters.

In certain examples, the optical connectors include ferrule-less optical connectors. For example, an example ferrule-less optical connector 300 known in the art is shown at FIG. 1. The optical connector 300 includes a connector body 322 having a front mating end 324 and a rear cable terminating end 326. An optical fiber extends forwardly through the connector body 322 and has a ferrule-less end portion that is accessible at the front mating end 324 of the connector body 322. The optical fiber is anchored adjacent the rear cable terminating end 326 against axial movement relative to the connector body 322. When two connectors 300 are coupled together, the end faces of the ferrule-less end portions abut one another, thereby causing the optical fibers to be forced rearwardly into the connector bodies 322 and to buckle/bend within fiber buckling regions of the connector bodies 322. A shutter 328 moves between closed and open positions. The shutter 328 protects the ferrule-less end portion of the optical fiber from contamination when shut and allows access to the ferrule-less end portion when open.

The connector 300 also includes a latch 330 that engages a catch 355 of a fiber optic adapter 350 (see FIG. 2). The latch 330 includes a resilient cantilever style latch. When the connectors 300 are inserted within the coaxially aligned ports of the adapter 350, the shutters 328 of the connectors 300 are retracted, thereby exposing the ferrule-less ends of the optical fibers. Continued insertion causes the ferrule-less ends to enter an optical fiber alignment device. In an example, the fiber alignment device includes funnels leading to a fiber alignment groove, and spring-biased balls pressing the fibers into the groove. Other examples of ferrule-less optical connectors and corresponding optical adapters can be found in U.S. patent application Ser. No. 14/377,189, filed Aug. 7, 2014, and titled "Optical Fiber Connection System Including Optical Fiber Alignment Device," the disclosure of which is incorporated herein by reference.

Other ferrule-less fiber optic connection systems are disclosed by United States Patent Application Publication Nos. US 2013/0216186 and US 2014/0072265. The '186 publication discloses a ferrule-less connector with a retractable nose piece. The '265 publication discloses an alignment system for multi-fiber connectors. Improvements are needed in the areas of enhanced fiber end protection and fiber alignment in the areas of single fiber and multi-fiber fiber optic connectors.

SUMMARY

Aspects of the present disclosure relate to features for enhancing fiber protection in ferrule-less connectors. In certain examples, a fiber optic connector in accordance with the principles of the present disclosure can include a shutter for providing initial protection of a fiber end, and a retractable nose piece for providing secondary protection of the fiber end. In certain examples, the nose piece can also be configured to assist in directing the fiber end into a corresponding alignment feature of a fiber optic adapter. In certain examples, the shutter and the nose piece are both automatically opened as the fiber optic connector is inserted within a corresponding fiber optic adapter. In certain examples, the shutter can include a latch that retains the shutter in a closed position until the fiber optic connector is inserted within the corresponding fiber optic adapter.

Another aspect of the present disclosure relates to a multi-fiber, ferrule-less connector having a retractable nose piece for protecting end portions of optical fibers of the fiber optic connector. In certain examples, the nose piece can assist in registering the end portions of the optical fibers with alignment features of a corresponding fiber optic adapter. In certain examples, the fiber optic adapter can include an array of V-grooves that receive the end portions of the optical fibers.

A further aspect of the present disclosure relates to a fiber optic connector including a connector body having a front end and an opposite rear end. The connector body defines a longitudinal axis that extends through the connector body in an orientation that extends from the front end to the rear end of the connector body. An optical fiber extends through the connector body from the rear end to the front end. The optical fiber has a fiber end that is accessible at the front end of the connector body. The fiber optic connector also includes a nose piece mounted at the front end of the connector body. The nose piece defines a fiber passage through which the optical fiber extends. The nose piece is movable along the longitudinal axis between an extended position where a front end portion of the optical fiber is protected within the fiber passage and a retracted position where the front end portion of the optical fiber projects forwardly beyond the nose piece. The fiber optic connector further includes a shutter mounted at the front end of the connector body. The shutter is movable between a first position where the shutter covers the nose piece and a second position where the nose piece is exposed. The nose piece provides protection to the front end portion of the optical fiber in the event the shutter is opened prior to insertion within a fiber optic adapter. Additionally, the nose piece can assist in registering the front end portion of the optical fiber with a corresponding alignment feature of the fiber optic adapter.

Another aspect of the present disclosure relates to a fiber optic connector including a connector body having a front end and an opposite rear end. The connector body defines a longitudinal axis that extends through the connector body in an orientation that extends from the front end to the rear end of the connector body. A plurality of optical fibers extend through the connector body from the rear end to the front end. The optical fibers have fiber ends accessible at the front end of the connector body. The fiber optic connector also includes a nose piece mounted at the front end of the connector body. The nose piece defines a plurality of fiber passages through which the optical fibers extend. The nose piece is movable along the longitudinal axis between an extended position where front end portions of the optical fibers are protected within the fiber passages and a retracted position where the front end portions of the optical fibers project forwardly beyond the nose piece.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 3 is a cross-sectional view showing a ferrule-less fiber optic connector in accordance with the principles of the present disclosure, the fiber optic connector is shown with a shutter in a closed position and a nose piece in an extended position;

FIG. 4 illustrates the ferrule-less fiber optic connector of FIG. 3 with the shutter in an open position and the nose piece in a retracted position;

FIG. 5 illustrates the ferrule-less fiber optic connector of FIGS. 3 and 4 in the process of being inserted into a mating fiber optic adapter;

FIG. 6 illustrates the ferrule-less fiber optic connector of FIGS. 3 and 4 fully inserted within the mating fiber optic adapter;

DETAILED DESCRIPTION

Figure 1:
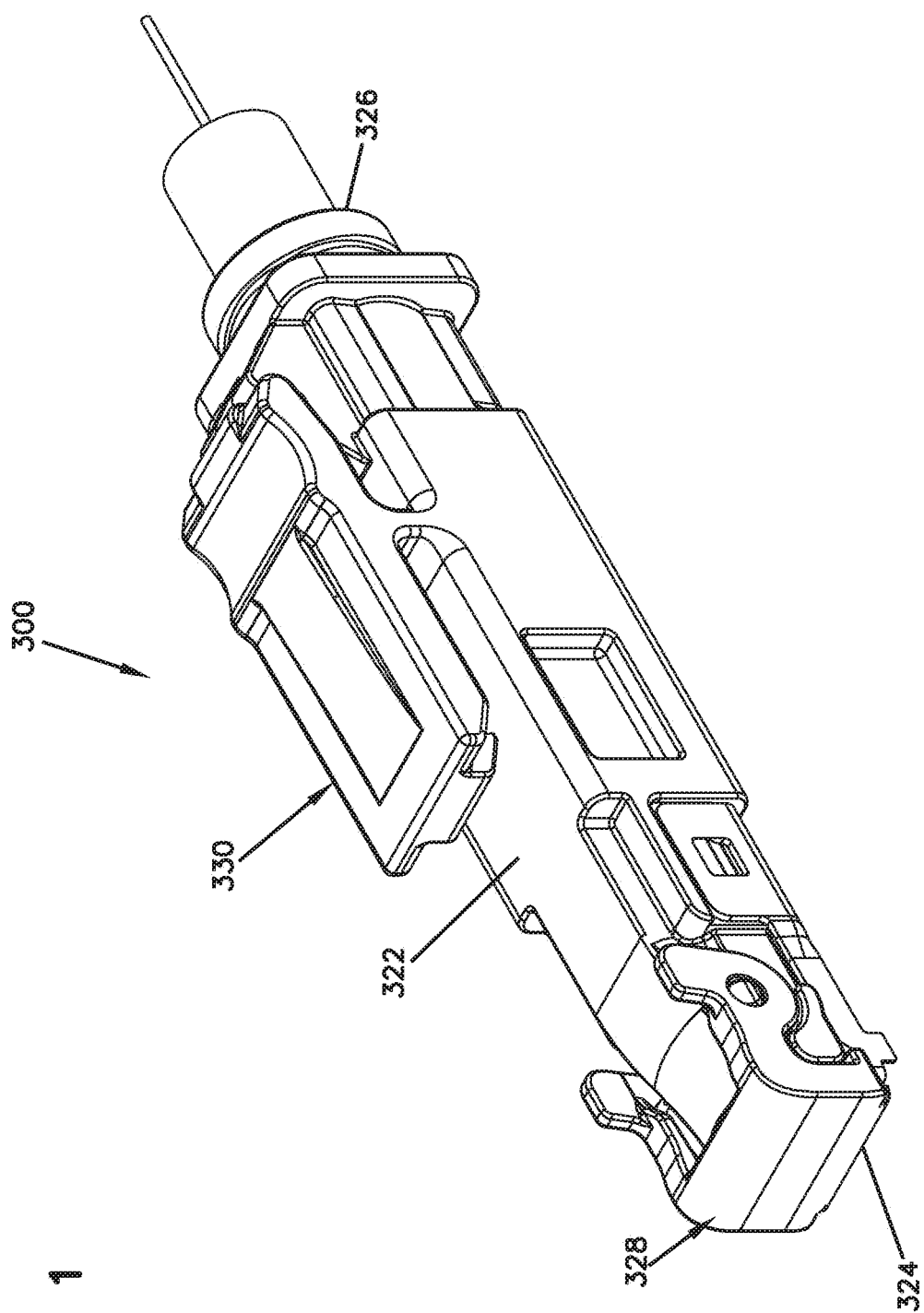
FIG. 1 illustrates a prior art ferrule-less fiber optic connector.
Figure 2:
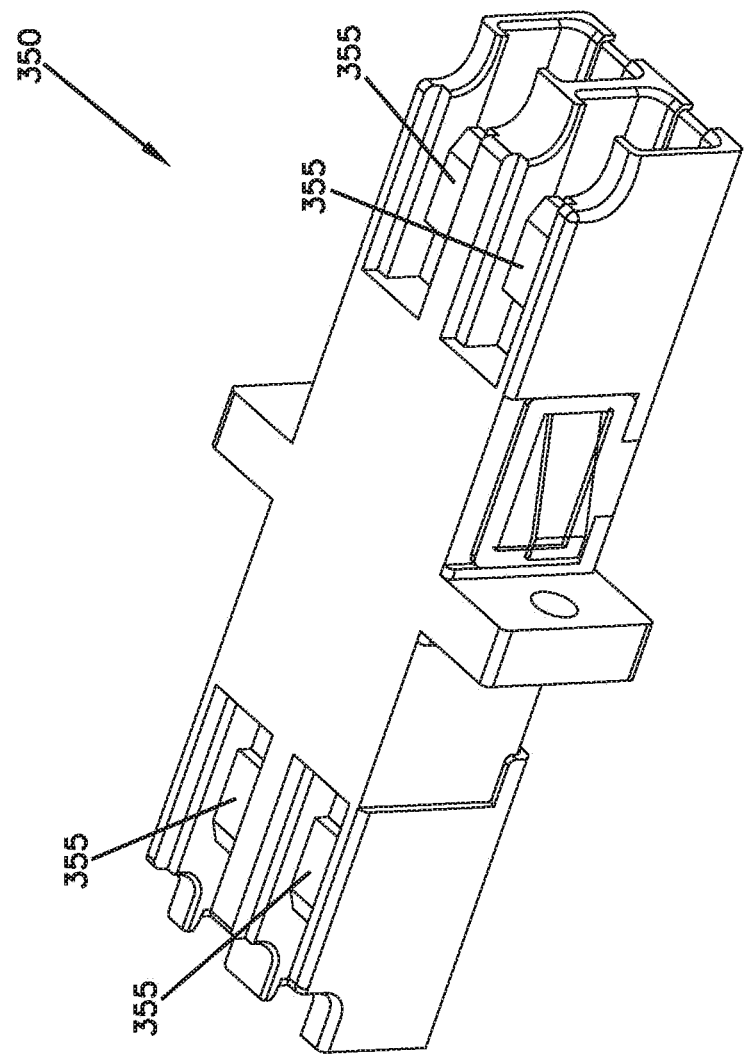
FIG. 2 illustrates a prior art fiber optic adapter compatible with the ferrule-less fiber optic connector of FIG. 1.

Reference will now be made in detail to exemplary aspects of the present disclosure that are illustrated in the accompanying drawings. Wherever possible, the same reference numbers will be used throughout the drawings to refer to the same or like parts.

Aspects of the present disclosure relate to ferrule-less fiber optic connectors. As used herein, a ferrule-less fiber optic connector is a fiber optic connector that does not have a ferrule bonded or otherwise affixed to an end portion of an optical fiber of the fiber optic connector. Structures are disclosed herein to provide enhanced fiber protection to end portions of optical fibers. Example structures can include shutters and/or retractable nose pieces.

FIGS. 3 and 4 illustrate an example fiber optic connector 20 in accordance with the principles of the present disclosure. The fiber optic connector 20 is depicted as a ferrule-less fiber optic connector. The fiber optic connector 20 includes a connector body 22 having a front end 24 and an opposite rear end 26. The connector body 22 defines a longitudinal axis 28 that extends through the connector body 22 in an orientation that extends from the front end 24 to the rear end 26 of the connector body 22. An optical fiber 30 extends through the connector body 22 from the rear end 26 to the front end 24. The optical fiber 30 has a fiber end 32 accessible at the front end 24 of the connector body 22. The fiber optic connector 20 also includes a nose piece 34 mounted at the front end 24 of the connector body 22. The nose piece 34 defines a fiber passage 36 through which the optical fiber 30 extends. The nose piece is movable along the longitudinal axis 28 between an extended position (see FIG. 3) where a front end portion 38 of the optical fiber 30 is protected within the fiber passage 36 and a retracted position (see FIG. 4) where the front end portion 38 of the optical fiber 30 projects forwardly beyond the nose piece 34. The fiber optic connector 20 further includes a shutter 40 mounted at the front end 24 of the connector body 22. The shutter is movable between a first position (e.g., a closed position as shown at FIG. 3) where the shutter 40 covers the nose piece 34 and a second position (e.g., open position as shown at FIG. 4) where the nose piece 34 is exposed.

In certain examples, the fiber optic connector 20 can include a spring 42 for biasing the nose piece 34 toward the extended position. In certain examples, the nose piece 34 retracts back into the connector body 22 as the nose piece 34 moves from the extended position toward the retracted position. In certain examples, the shutter 40 is configured to pivot relative to the connector body 22 as the shutter moves between the open and closed positions. In certain examples, the fiber optic connector 20 can include a latch for retaining the shutter 40 in the closed position. In certain examples, the latch can be released when the fiber optic connector 20 is inserted within a mating fiber optic adapter thereby allowing the shutter 40 to be moved between the closed and open positions. In certain examples, relative movement is permitted between the nose piece 34 and the optical fiber 30 so that the nose piece 34 can slide relative to the optical fiber 30. In certain example, the fiber optic connector 20 includes a fiber anchoring region 41 near the rear end of the connector body 22 where the optical fiber 30 is fixed in position relative to the connector body 22 thereby preventing relative axial movement between the fiber 30 and the connector body 22 at the anchoring location 41. In certain examples, a fiber buckling region 43 is provided in the connector body 22 between the anchoring region 41 and the end portion 38 of the optical fiber 30. The buckling region allows the fiber to buckle (i.e., bend, flex) within the connector body 22 when an optical connection is being made.

FIGS. 5 and 6 show an example fiber optic adapter 50 compatible with the fiber optic connector 20. It will be appreciated that the fiber optic connector 50 is configured for coupling two of the fiber optic connectors 20 together such that optical signals can be conveyed between the optical fibers of the coupled fiber optic connectors 20. The fiber optic adapter 50 can have an alignment feature 52 for receiving and coaxially aligning the front end portions 38 of the optical fibers of the coupled fiber optic connectors 20. In certain examples, the alignment feature 52 can include an alignment passage such as a V-groove 53. In certain examples, the alignment feature 52 can include a biasing structure such as a spring-loaded component that presses the front end portions 38 of the optical fibers 30 into the alignment passage. As depicted, the spring-loaded components can include members 55 (e.g., balls, rods, or other structures) spring-biased toward fiber alignment surfaces (e.g., surfaces defining a v-groove) of the alignment passage.

In certain examples, fiber optic adapter 50 can include opposite first and second adapter ports 54, 56 with the alignment feature 52 disposed therein between. The first and second adapter ports 54, 56 can be configured for respectively receiving fiber optic connectors 20 desired to be coupled together. It will be appreciated that the shutters 40 of the fiber optic connectors 20 move from the closed position to the open position as the fiber optic connectors 20 are inserted into their respective ports 54, 56. Similarly, the nose pieces 34 of the fiber optic connectors 20 move from the extended positions to the retracted positions as the fiber optic connectors 20 are inserted into their respective ports 54, 56. When the nose pieces 34 retract, the front end portions 38 of the optical fibers 30 protrude forwardly beyond the nose pieces 34 and thereby can be inserted into the alignment passage (e.g., groove) of the alignment feature 52. In certain examples, the shutters 40 move at least partially toward the open positions prior to the nose pieces 34 beginning to move from the extended positions toward the retracted positions. In certain examples, the fiber passages 36 of the nose pieces 34 align with the alignment passages of the alignment feature 52 to assist in guiding the front end portions 38 into the alignment groove of the alignment feature 52 as the nose pieces 34 retract.

As described above, in certain examples, the alignment passage is defined by an open-sided groove such as a V-groove. Additionally, in certain examples, resilient structures are provided for biasing the front end portions 38 of the optical fibers 30 into the open sided grooves. In certain examples, the resilient structures can include structures such as spring-biased balls, flexible cantilevers and other structures.

In certain examples, the alignment passage is defined by the fiber alignment feature 52 of the fiber optic adapter 50. In certain examples, the fiber alignment feature 52 can include first and second opposite ends 58, 59. In certain examples, the nose pieces 34 of the fiber optic connectors 20 inserted within the adapter ports 54, 56 respectively abut against the first and second ends 58, 59 of the fiber alignment feature 52 when the fiber optic connectors 20 are inserted into the first and second adapter ports 54, 56 thereby causing the nose pieces 34 to retract.

FIGS. 7-10 illustrate another fiber optic connector 120 in accordance with the principles of the present disclosure. In the depicted example, fiber optic connector 120 is a ferruleless, multi-fiber fiber optic connector.

Referring still to FIGS. 7-10, the fiber optic connector 120 includes a connector body 122 having a front end 124 and an opposite rear end 126. In certain examples, a fiber optic cable can be coupled to the fiber optic connector 120 adjacent the rear end 126. The connector body 122 defines a longitudinal axis 128 that extends through the connector body 122 in an orientation that extends from the front end 124 to the rear end 126 of the connector body 122. A plurality of optical fibers 130 extend through the connector body 122 from the rear end 126 to the front end 124. The optical fibers 130 have fiber ends 132 accessible at the front end 124 of the connector body 122. The fiber optic connector 120 also includes a nose piece 134 mounted at the front end 124 of the connector body 122. The nose piece 134 defines a plurality of fiber passages 136 through which the optical fibers 130 extend. It will be appreciated that the optical fibers 130 are slidable within the fiber passages 136 such that relative movement is permitted in an orientation that extends along the longitudinal axis 128. The nose piece 134 is movable along the longitudinal axis 128 relative to the connector body 122 between an extended position (see FIGS. 7 and 8) where front end portions 138 of the optical fibers 130 are protected within the fiber passages 136 and a retracted position (see FIGS. 9 and 10) where the front end portions 138 of the optical fibers 130 project forwardly beyond the nose piece 134. It will be appreciated that when the nose piece 134 is in the retracted position, the front end portions 138 of the optical fibers 130 project forwardly beyond the nose piece 134 a distance sufficiently long to allow the front end portions 138 to be inserted within a suitable alignment structure. In certain examples, an alignment structure can be provided within a fiber optic adapter configured for coupling two of the fiber optic connectors 120 together. In another example, a direct connection may be made between mating fiber optic connectors without the use of an intermediate adapter. In such an example, the front end portions 138 of the fibers of one fiber optic connector may fit within alignment grooves defined by a mating fiber optic connector.

Figure 7:
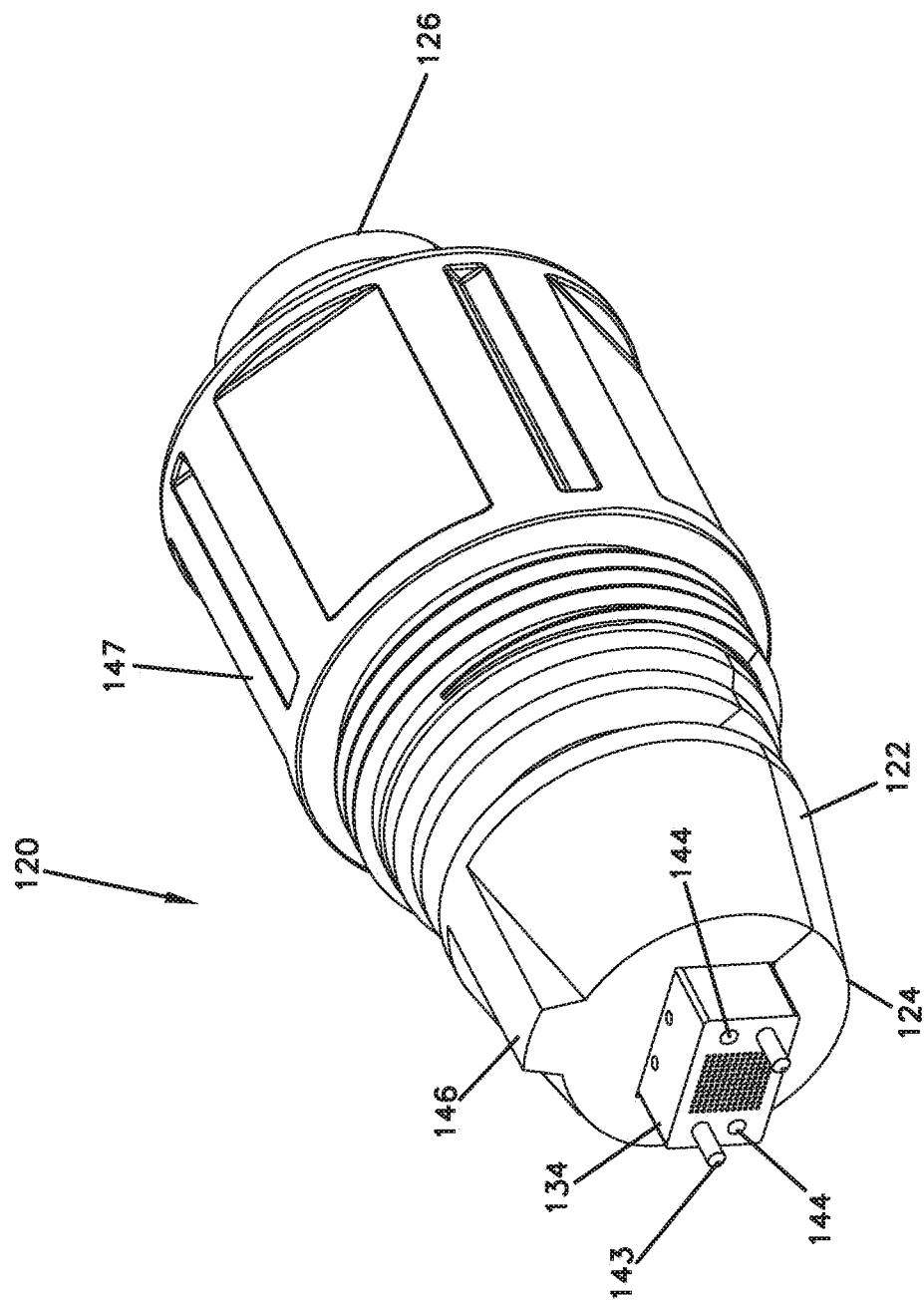
FIG. 7 is a perspective view illustrating a multi-fiber, ferrule-less connector in accordance with the principles of the present disclosure, a nose-piece of the fiber optic connector is shown in an extended orientation.
Figure 8:
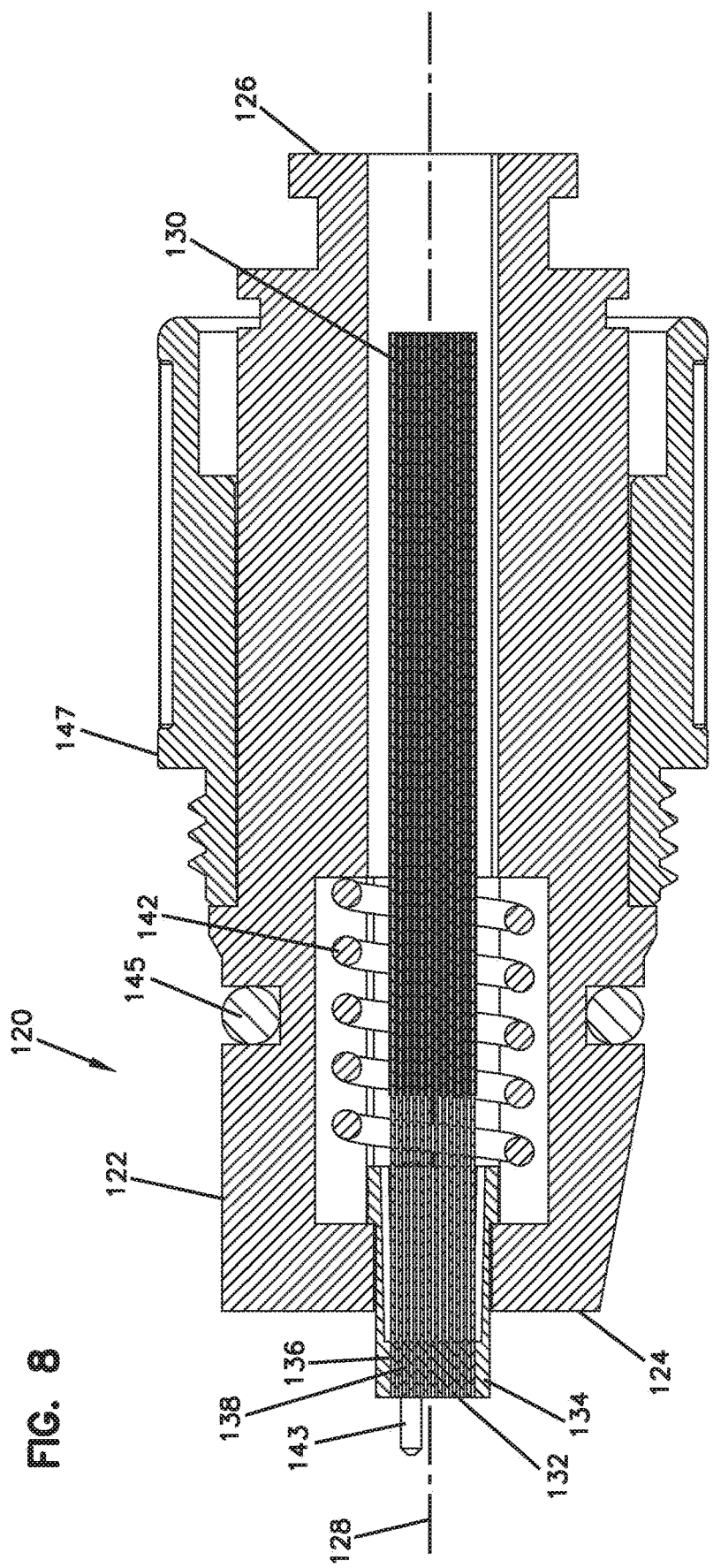
FIG. 8 is a cross-sectional view of the multi-fiber, ferrule-less connector of FIG. 7.
Figure 9:
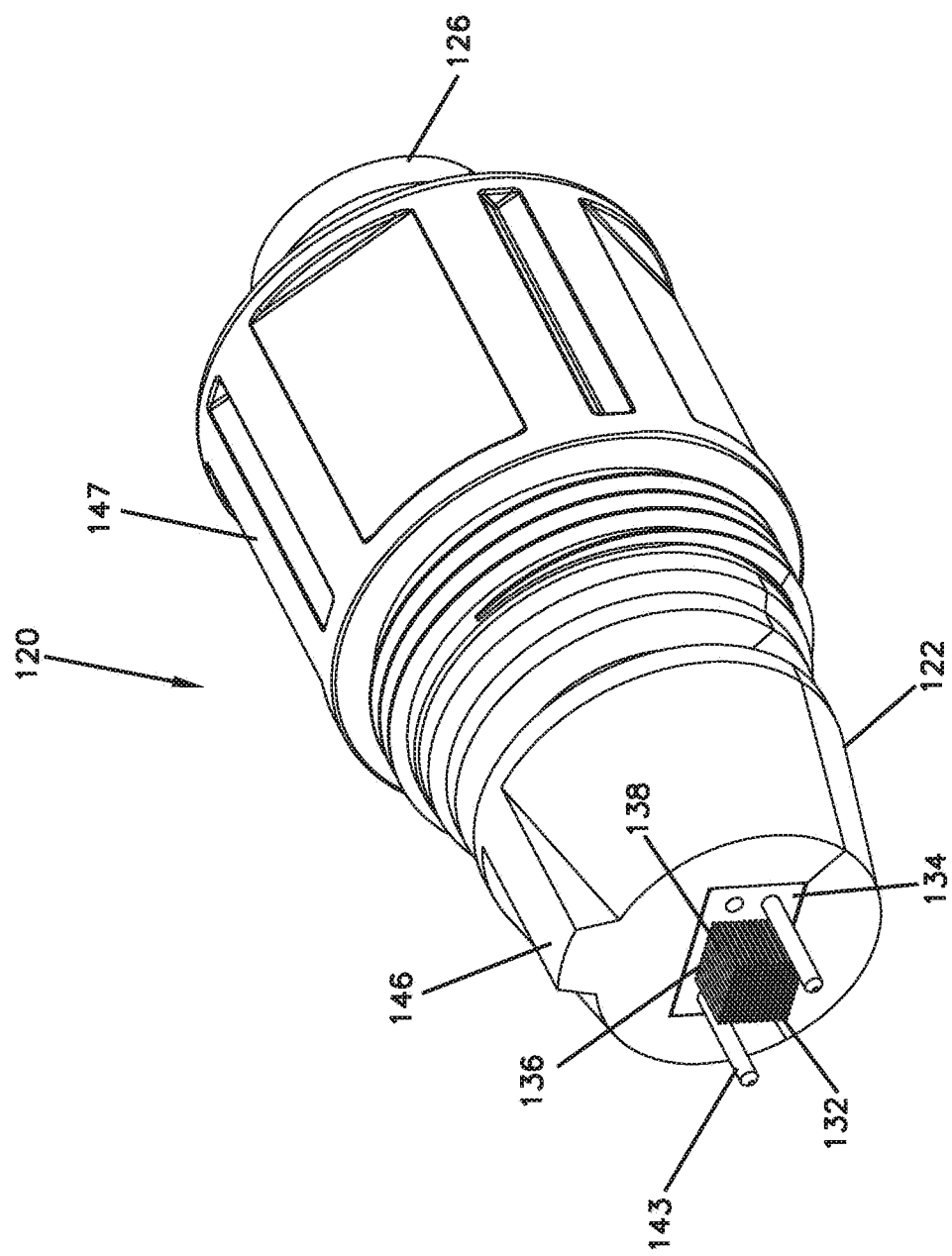
FIG. 9 illustrates the multi-fiber, ferrule-less connector of FIG. 7 with the nose piece in a retracted orientation.
Figure 10:
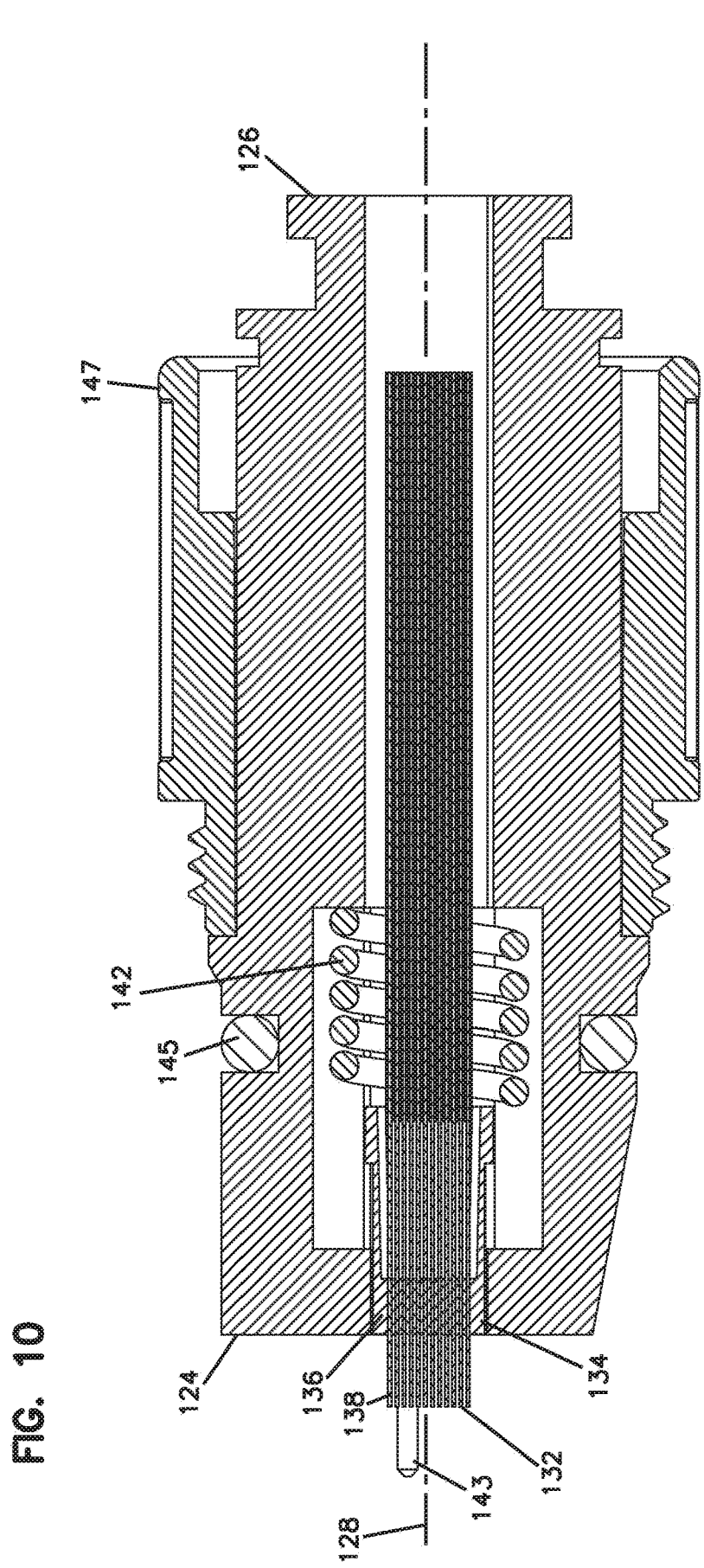
FIG. 10 is a cross-sectional view of the multi-fiber, ferrule-less connector of FIG. 9.

Referring to FIGS. 8 and 10, the fiber optic connector 120 can include a spring 142 for biasing the nose piece 134 toward the extended orientation. Additionally, as shown at FIGS. 7 and 9, registration elements can be provided on the nose piece 134 to assist in providing registration between two fiber optic connectors desired to be coupled together. In certain examples, the registration structures can include alignment pins 143 and/or alignment openings 144. In certain examples, the alignment pins 143 can fit within alignment openings of a corresponding fiber optic connector or a corresponding fiber optic adapter, and the alignment openings 144 can receive alignment pins of a mating fiber optic connector or a mating fiber optic adapter.

In certain examples, fiber optic connector 120 is a robust, hardened fiber optic connector suitable for outdoor use. In certain examples, fiber optic connector 120 can include structure for providing environmental sealing when inserted within the port of a corresponding fiber optic adapter or when coupled to a mating fiber optic connector. For example, as shown at FIGS. 8 and 10, the fiber optic connector 20 can include a sealing element such as an annular sealing ring 145 (e.g., an O-ring) that mounts within an annular groove that extends about the perimeter of the connector body 122. In certain examples, a robust coupling element can be provided for securing the connector body 22 within the corresponding port of a fiber optic adapter or to a mating fiber optic connector. For example, the robust coupling element can include a twist-to-lock coupling element such as a threaded coupling element 147 (e.g., an exteriorly threaded nut or an interiorly threaded sleeve) or a bayonet-style coupling element.

It will be appreciated that the connector body 122 can also include one or more keying features for ensuring that the fiber optic connector is inserted into a corresponding port of a fiber optic adapter or mating fiber optic connector at a predetermined rotational orientation. Example keying structures can include rails, projections, grooves or other structures. As depicted, the fiber optic connector 120 is provided with a key in the form of a rail 146 configured to fit within a corresponding groove defined by a mating adapter or connector port.

Figure 11:
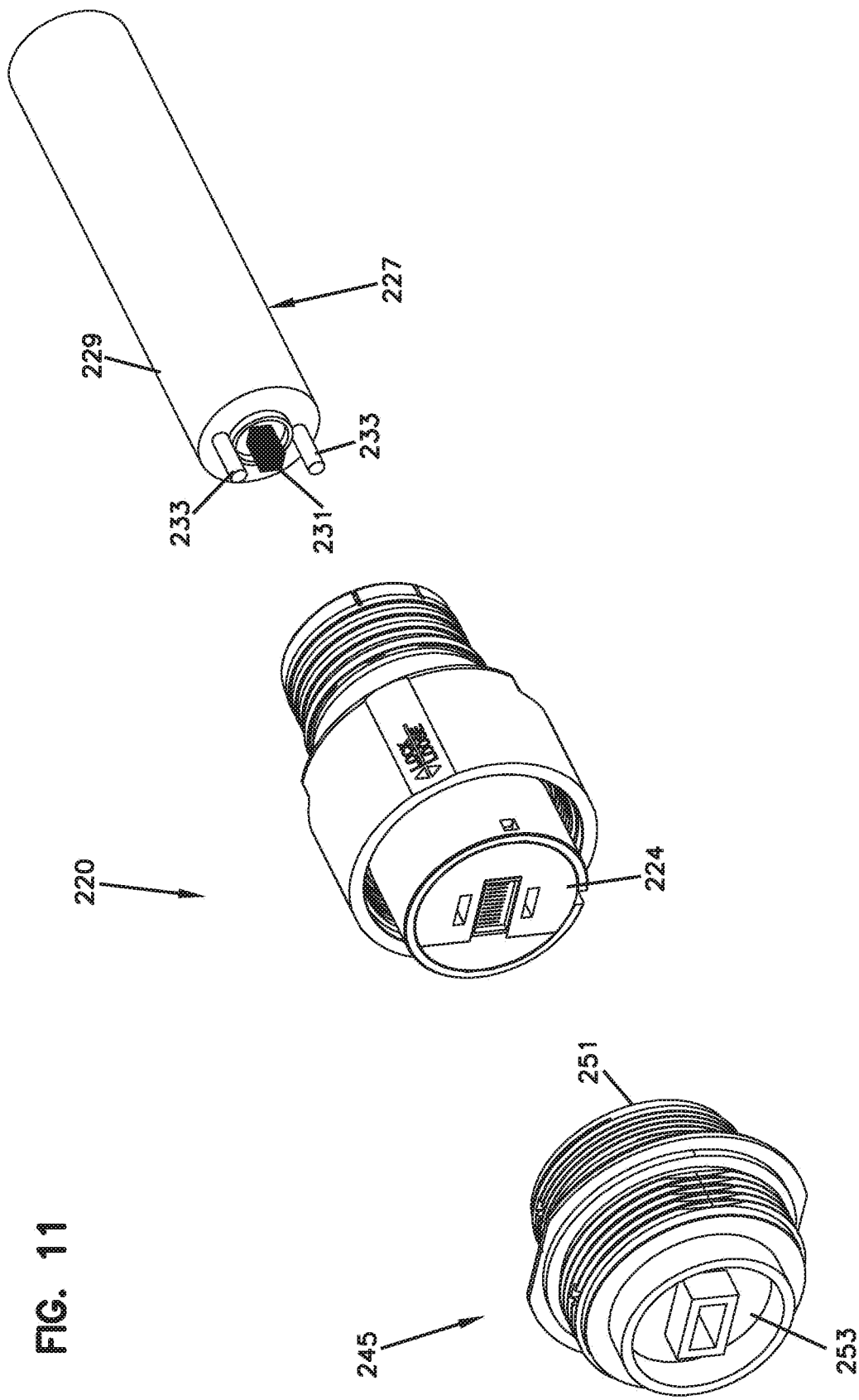
FIG. 11 illustrates a multi-fiber, ferrule-less fiber optic connection system in accordance with the principles of the present disclosure.
Figure 12:
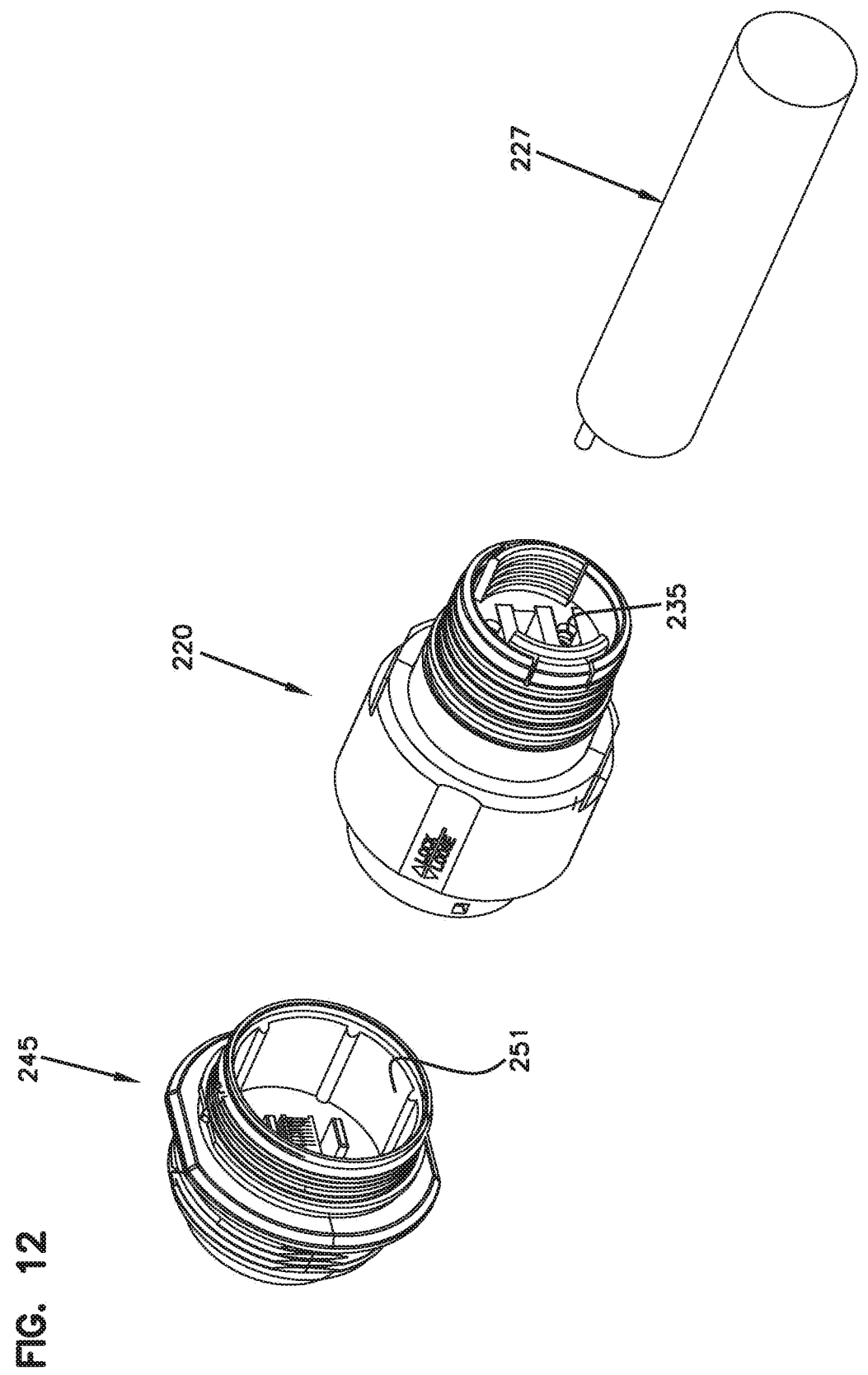
FIG. 12 is another view of the fiber optic connection system of FIG. 11.
Figure 13:
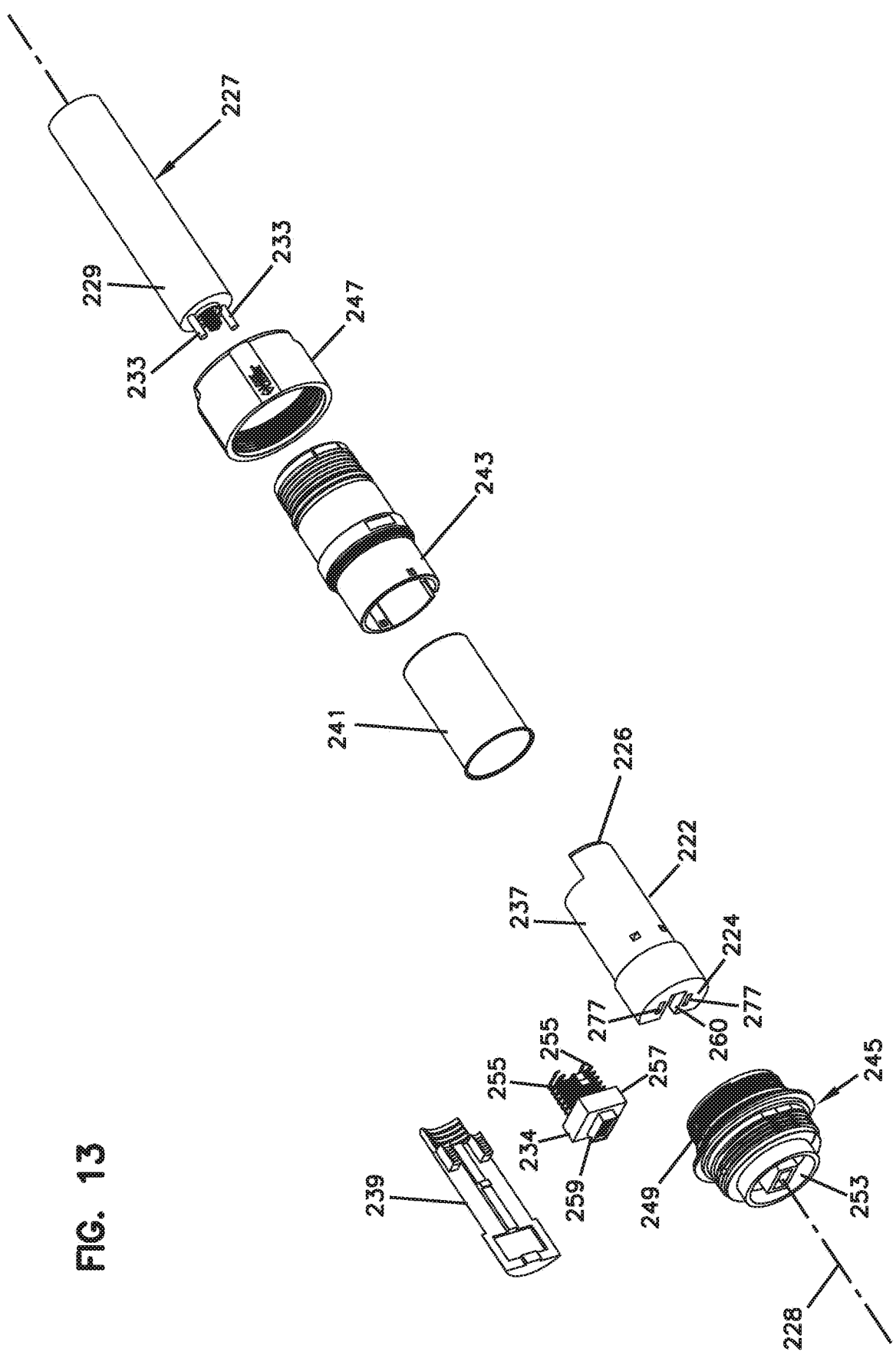
FIG. 13 is an exploded view of the fiber optic connection system of FIGS. 11 and 12.
Figure 14:
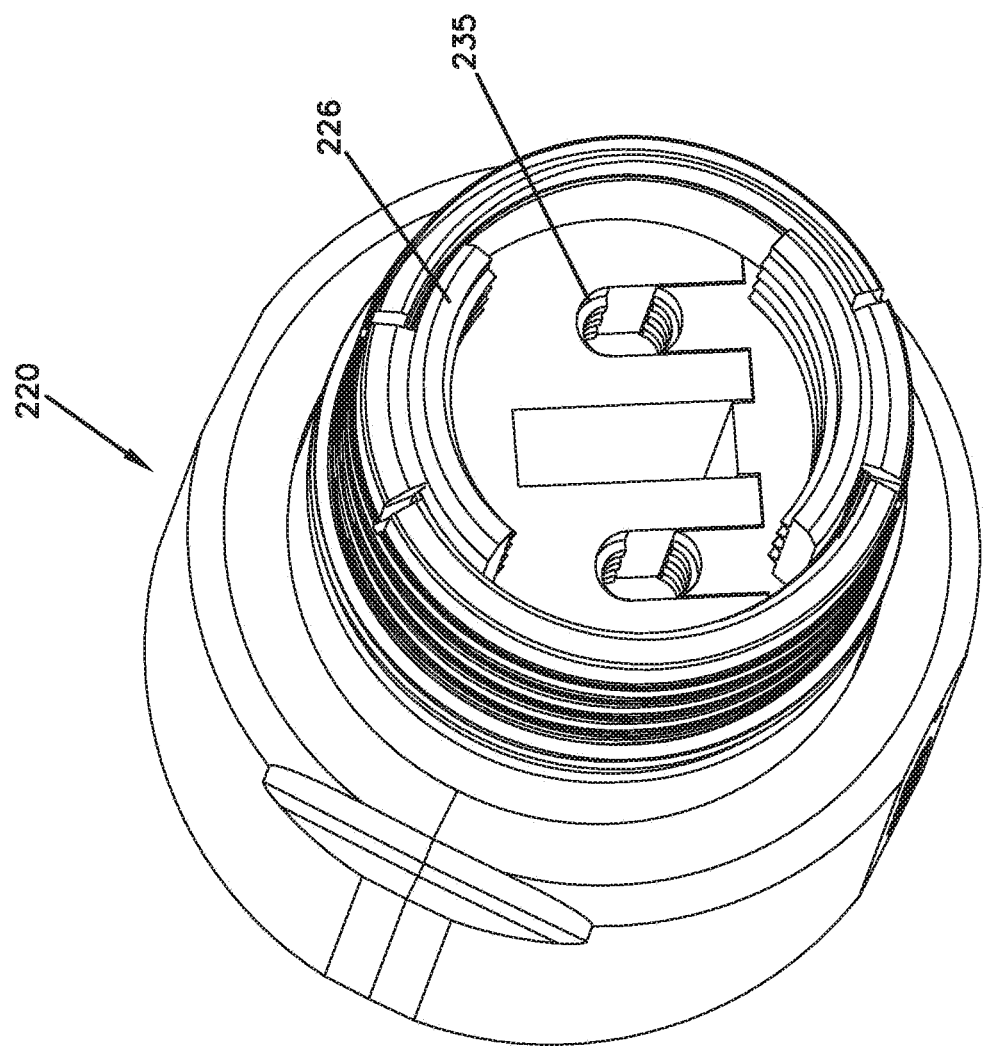
FIG. 14 is a rear, perspective view of a multi-fiber connector of the fiber optic connection system of FIGS. 11 and 12.
Figure 15:
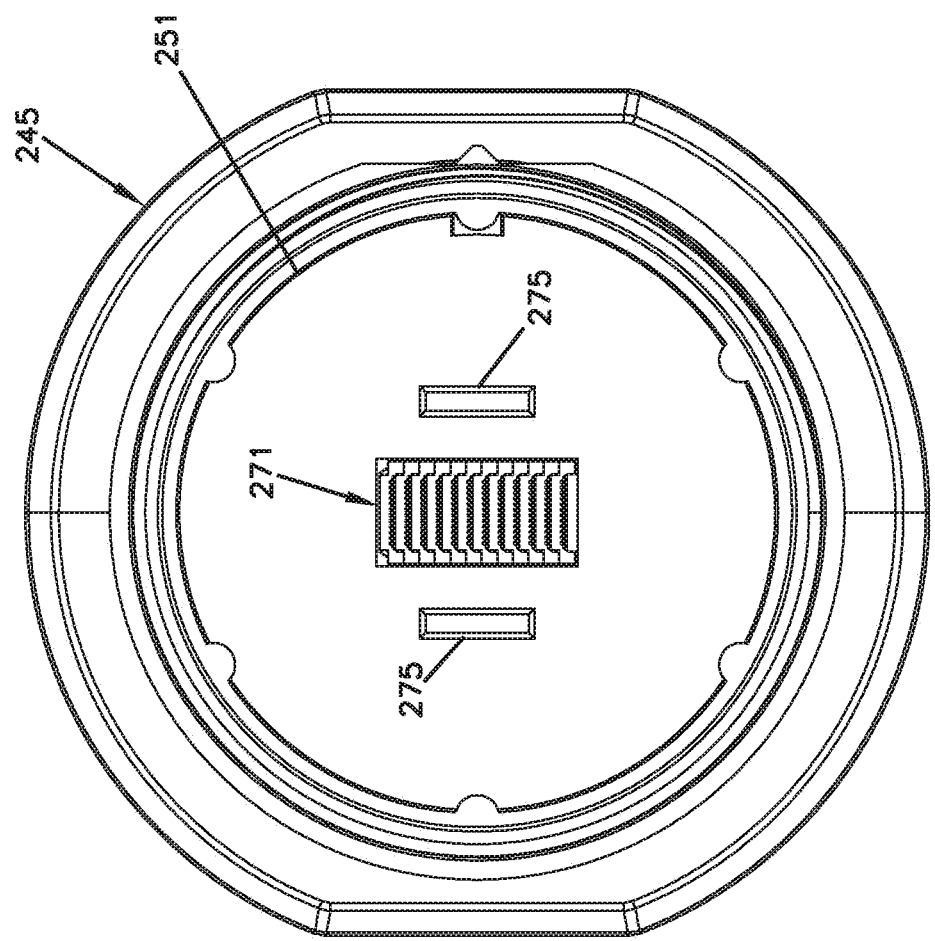
FIG. 15 is an end view of a port of a fiber optic adapter of the fiber optic connection system of FIGS. 11 and 12.
Figure 16:
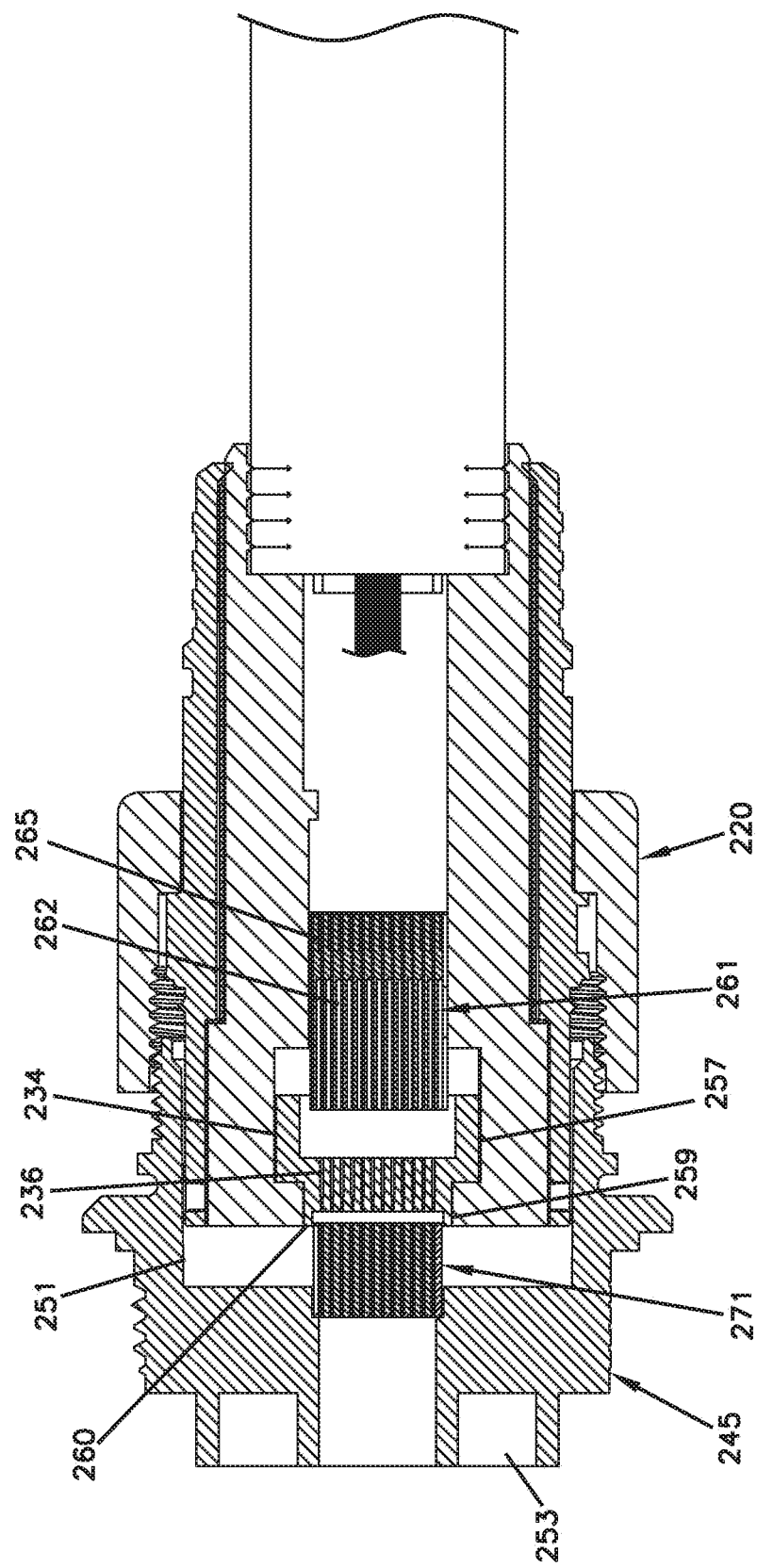
FIG. 16 is a cross-sectional view of the fiber optic connection system of FIGS. 11 and 12 in a partially connected state (i.e., the fiber optic connector is partially inserted within the port of the corresponding fiber optic adapter)
Figure 17:
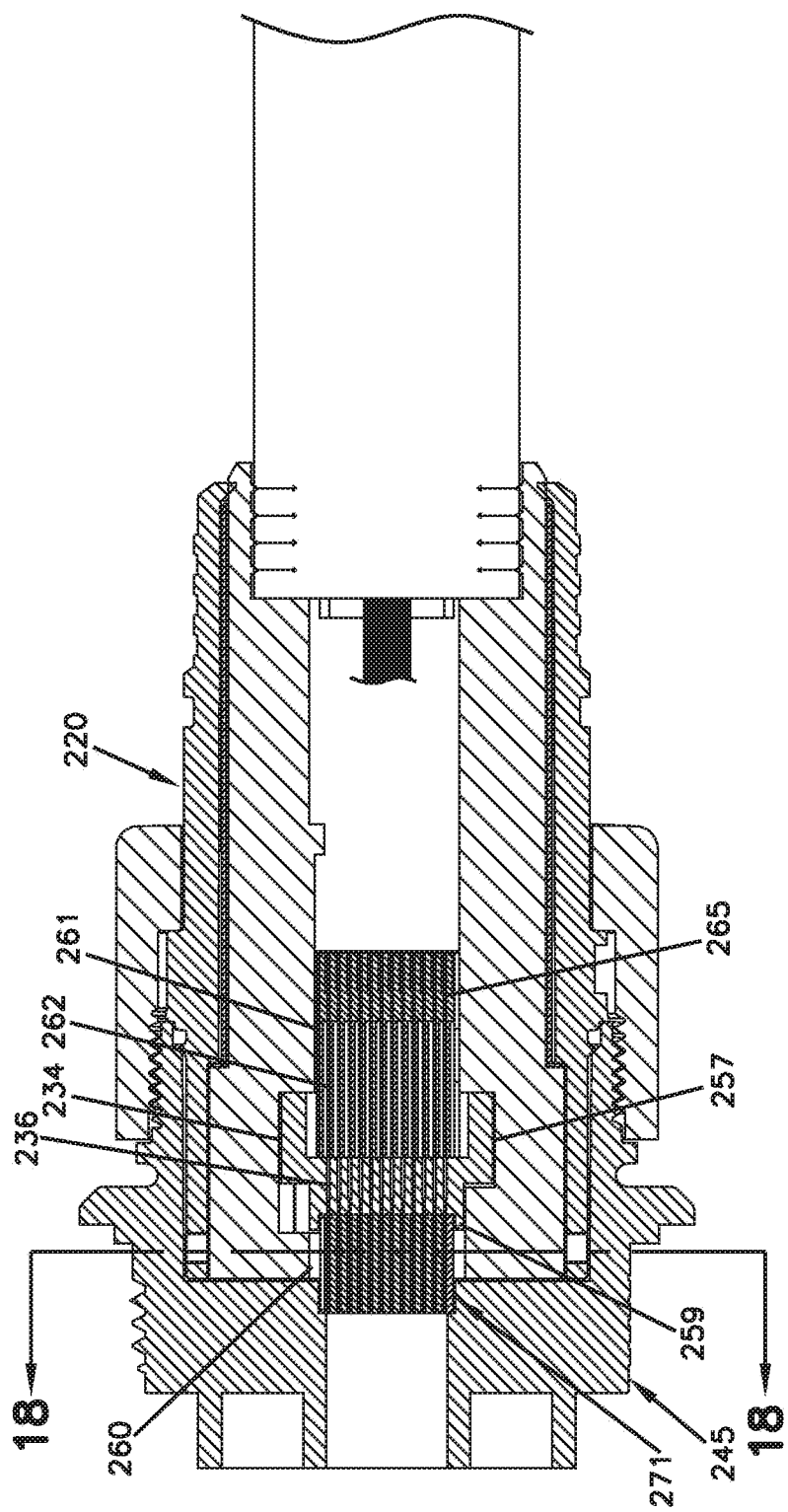
FIG. 17 is a cross-sectional view of the fiber optic connection system of FIGS. 11 and 12 in a fully connected state (i.e., the fiber optic connector is partially inserted within the port of the corresponding fiber optic adapter)
Figure 18:
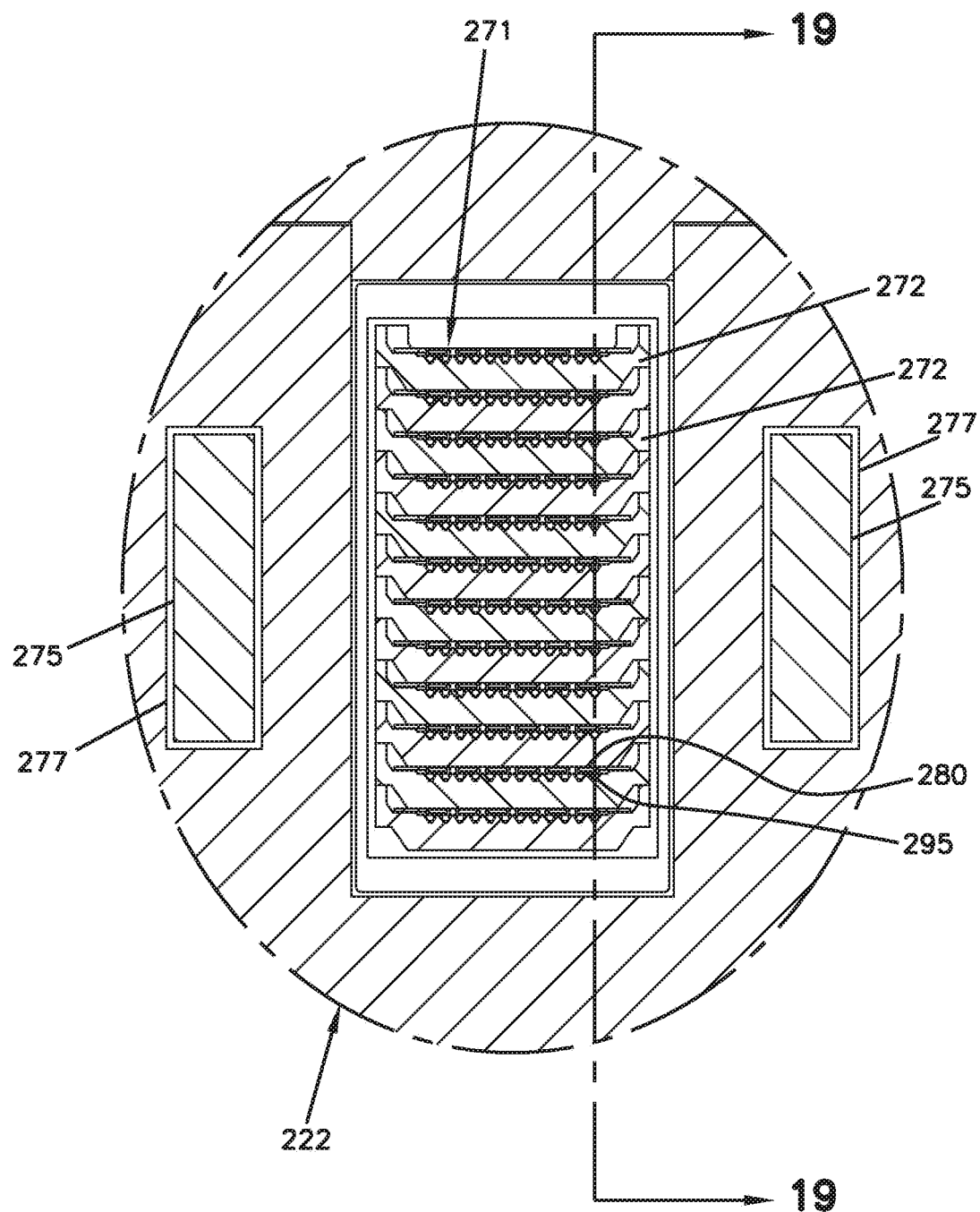
FIG. 18 is a cross-sectional view taken along section line 18-18 of FIG. 17 showing a fiber alignment tray stack that forms a fiber alignment feature of the fiber optic adapter.

FIGS. 11-13 illustrate another multi-fiber fiber optic connector 220 in accordance with the principles of the present disclosure. The fiber optic connector 220 includes a connector body 222 having a front end 224 and an opposite rear end 226. The connector body 222 defines a longitudinal axis 228 that extends along a length of the connector body 222. The rear end 226 of the connector body 224 can be configured to couple to a fiber optic cable 227. The fiber optic cable 227 can include a jacket 229 containing a plurality of optical fiber ribbons 231. The fiber optic cable 227 can include reinforcing members 233 (e.g., reinforcing rods such as epoxy reinforced fiber glass rods or other types of reinforcing elements such as Aramid yarn). In certain examples, the reinforcing members 233 can be secured (e.g., bonded, clamped, or otherwise attached) to the connector body 222. In certain examples, the reinforcing members 233 can be secured within openings 235 (see FIG. 14) defined adjacent the rear end 226 of the connector body 222. As depicted, the fibers are not shown routed through the fiber optic connector 220.

Referring to FIG. 13, the connector body 122 has a two-part construction including a main body 237 and a cover 239. The main body 237 and the cover 239 mate together to form the connector body 222. A reinforcing sleeve 241 can be mounted over the connector body 222 after the cover 239 and the main body 237 have been mated together. The fiber optic connector 120 can also include an outer housing 243 that mounts over the connector body 222. Additionally, the fiber optic connector 220 can include a fastening element such as a robust fastening element for securing the fiber optic connector 220 to a corresponding fiber optic adapter 245. In certain examples, the fastening element can include a twist-to-lock fastening element such as a bayonet-style fastening element or a threaded fastening element. As depicted, the fastening element includes an internally threaded sleeve 247 that mates with corresponding exterior threads 249 provided at one end of a fiber optic adapter 245.

The fiber optic adapter 245 includes a first port 251 that receives the fiber optic connector 222 and an opposite second port 253 adapted to receive a fiber optic connector desired to be optically coupled to the fiber optic connector 222. In certain examples, the fiber optic adapter 245 can be mounted within a hole in an enclosure or panel and can have suitable sealing structure for providing an environmental seal with the panel or enclosure.

Referring to FIG. 13, fiber optic connector 220 can include a nose piece 234 that is movable along the longitudinal axis 228 relative to the connector body 222 between an extended position and a retracted position. The nose piece 234 can define a plurality of fiber passages 236 that receive front end portions of optical fibers corresponding to the optical fiber ribbons 231. In certain examples, the front end portions can be bare glass portions of the optical fibers including only the fiber cores and cladding layers. It will be appreciated that the front end portions (not shown) of the optical fibers can slide within the nose piece 234 as the nose piece 234 is moved between the extended and retracted positions. When the nose piece 234 is extended, the front end portions of the optical fibers are protected and enclosed within the nose piece 234. When the nose piece 234 is retracted, the front end portions of the optical fibers are exposed thereby allowing the front end portions to be inserted within a corresponding alignment feature provided in the fiber optic adapter 245.

In certain examples, the nose piece 234 can be spring-biased toward the extended position by one or more springs 255 positioned within the connector body 222. In certain examples, the nose piece 134 can include a main body 257 and a front extension 259. The main body 257 can be captured within an interior of the connector body 222, and the front extension 259 can extend into a front opening 260 defined at the front end 224 of the connector body 222. The main body 257 can define flanges that project outwardly from the front extension 259. In certain examples, the springs 255 can be positioned on opposite sides of the optical fibers (e.g., above and below) and can engage a backside of the main body 257 at the flanges. In certain examples, the two-piece construction of the connector body 222 facilitates laterally loading the nose piece 234, the springs 255 and other components into the interior of the connector body 222.

It will be appreciated that the fiber optic connector 220 can also include structure within the interior of the connector body 220 for managing and anchoring the optical fibers. In certain examples, the fiber management and anchoring structure can be defined by a stack of miniature fiber management trays 261 positioned within the connector body 222. The fiber management trays 261 can define a separate fiber buckling passages 262 corresponding to each of the optical fibers. The stack of fiber management trays 261 can also include a fiber anchoring region 265 for anchoring the optical fibers relative to the connector body 222. It will be appreciated that the fiber buckling passages 264 are positioned between the fiber anchoring region 265 and the passages 236 in the nose piece 234 for receiving the front end portions of the optical fibers.

As shown at FIGS. 22-26, the fiber management trays 261 can each include a first side (e.g., a top side as depicted) defining a plurality of parallel shallow grooves 290 and an opposite second side (e.g., a bottom side as depicted) defining a plurality of deeper grooves 291. When the trays 261 are stacked, the top and bottom sides of adjacent trays 261 oppose one another and interlock or mate with one another to provide mechanical registration between the trays 261. The shallow and deeper grooves 291 register within one another and cooperate to define the separate fiber buckling passages 262. The opposing sides of adjacent trays 261 also form clamping regions 293 where the spacing between the opposing sides is small enough that the optical fibers are compressed between the trays and held in place. The clamping regions 293 can form the fiber anchoring region 265.

In certain examples, fiber management trays 261 are mounted in fixed relation relative to the connector body 222, and the nose piece 234 is free to move forwardly and rearwardly relative to the fiber management trays 261. In certain examples, the fiber buckling slots 263 generally align with the fiber passages 236 of the nose piece 234.

Figure 19:
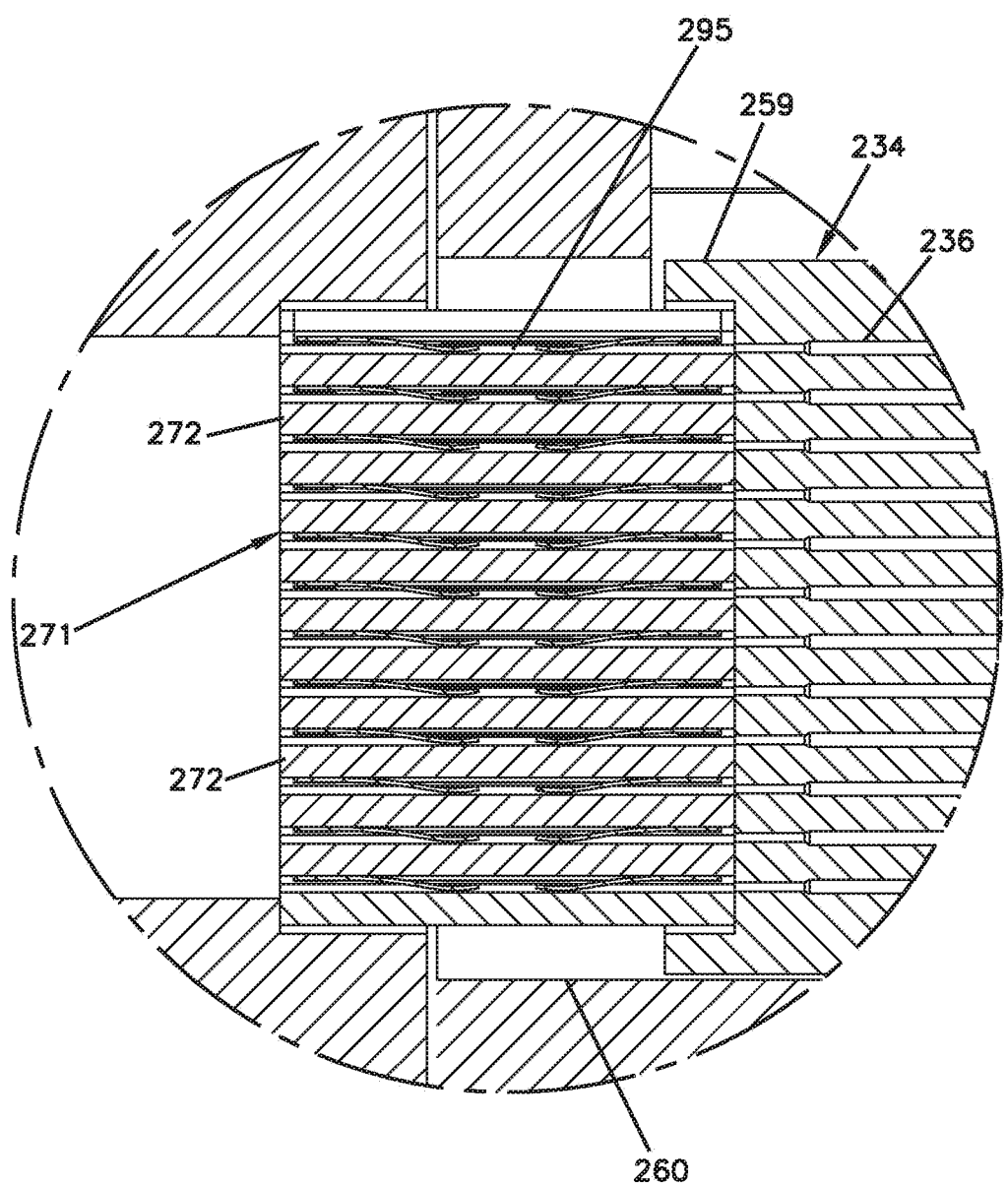
FIG. 19 is a cross-sectional view taken along section line 19-19 of FIG. 18 showing cantilever springs that oppose and extend along V-grooves of the fiber alignment feature an that function to bias/hold optical fibers in contact with angled alignment surfaces of the v-grooves.

It will be appreciated that the fiber optic adapter 245 can include an interior fiber alignment feature 271 for coaxially aligning the optical fibers of the fiber optic connector 220 with the optical fibers of a corresponding fiber optic connector desired to be coupled to the fiber optic connector 220 via the fiber optic adapter. In certain examples, the fiber alignment feature 271 includes a stack of fiber alignment trays 272 that define an array of alignment grooves (e.g., V-grooves 295) for receiving the front end portions of the optical fibers when the fiber optic connector 220 is inserted within the first port 251 and the nose piece 234 is retracted. It will be appreciated that the fiber passages 236 assist in registering the optical fibers 130 with the alignment grooves 295 defined by the fiber alignment trays 272 (see FIG. 19). In certain examples, an end of the fiber alignment feature 271 can fit or mate at least partially within the front end 224 of the connector body 222 (e.g., the alignment feature can fit within the front opening 260). In this way, the distance the fibers project beyond the front end of the connector body 222 is minimized while still allowing substantial lengths of the optical fibers to be inserted within the fiber alignment feature 271 of the fiber optic adapter 245.

The fiber optic adapter 245 can also include alignment projections 275 that fit within corresponding alignment openings 277 defined by a front face of the connector body 222 when the fiber optic connector 220 is inserted within the first port 251 of the fiber optic adapter 245. The mating alignment projections 275 and alignment openings 277 can provide an alignment and keying function. Additionally, when the alignment projections 275 slide into the alignment openings 277, the alignment projections 275 can engage a front side of the main body 257 of the nose piece 234 thereby causing the nose piece to move from the extended position toward the retracted position as the fiber optic connector 220 is inserted into the first port 251.

When the fiber optic connector 220 is optically coupled to another fiber optic connector by the fiber optic adapter 245, the fiber ends of the coupled fiber optic connectors preferably engage one another. The fiber buckling slots 263 provide space for allowing the optical fibers 230 to slightly buckle within the connector body 222 as the fiber ends 232 contact one another. Thus, the fiber buckling slots 263 provide take-up regions for receiving buckled portions of the fibers when an optical connection is made. The buckling of the fibers provides axial loading on the optical fibers that ensures the end faces of the optical fibers remain in contact with one another. Additionally, the ability to allow the optic fibers to buckle provides extra tolerance and range of motion that ensures all of the optical fibers of the interconnected fiber optic connectors in engagement with one another.

Figure 20:
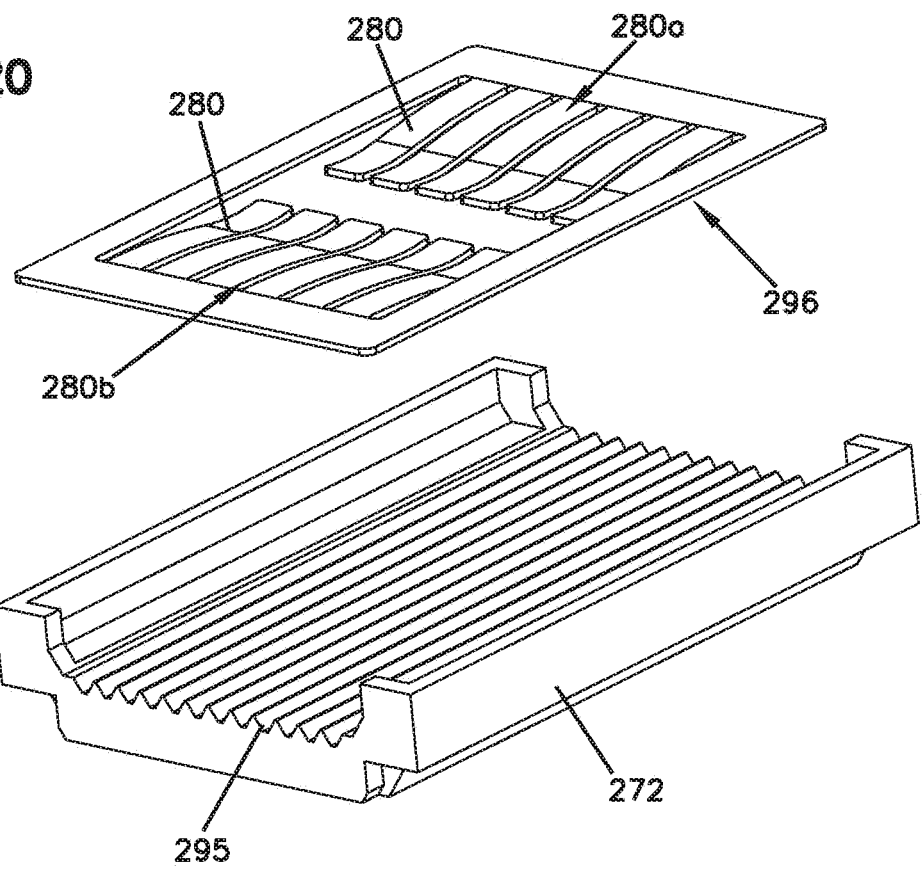
FIG. 20 is an isolated, exploded view of one of the fiber alignment trays and a biasing layer of the fiber alignment tray stack.
Figure 21:
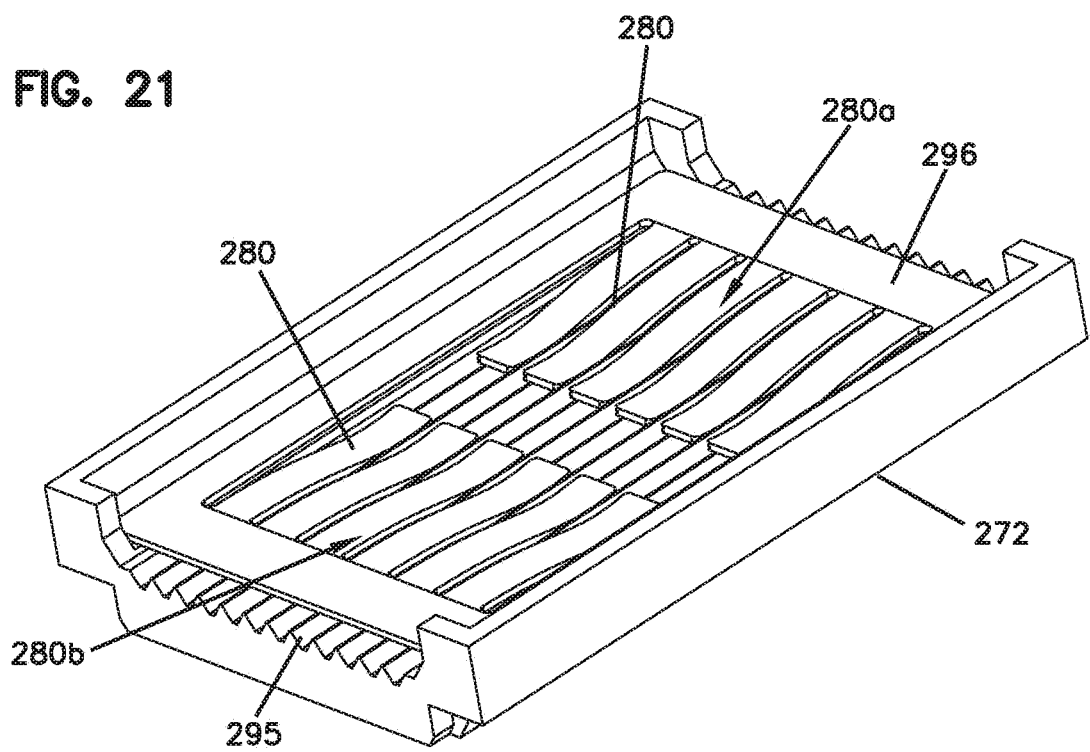
FIG. 21 shows the biasing layer of FIG. 20 mounted on its corresponding fiber alignment tray.
Figure 22:
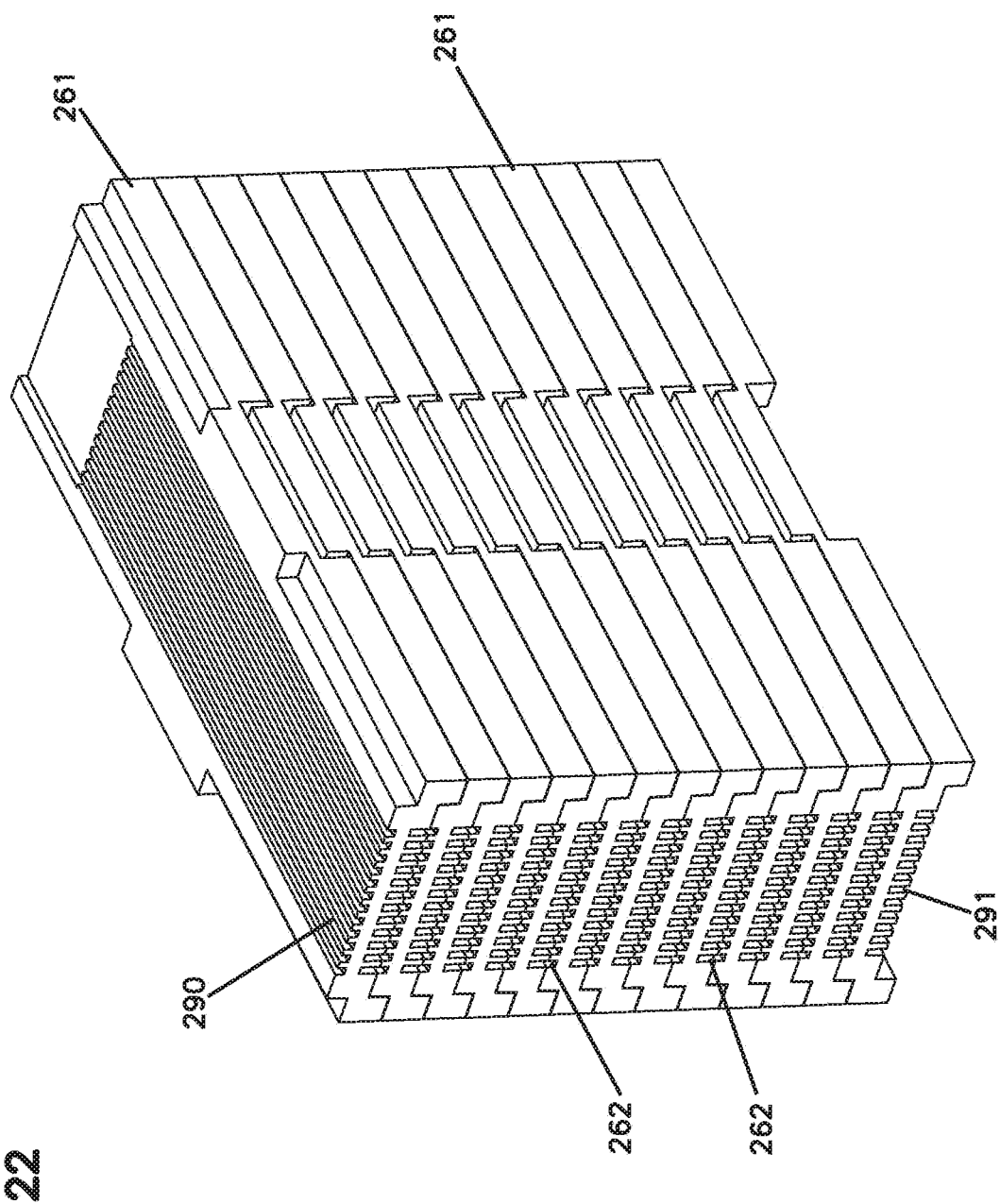
FIG. 22 is an enlarged view of a fiber management and anchoring tray stack of the multi-fiber connector depicted at FIGS. 16 and 17.
Figure 23:
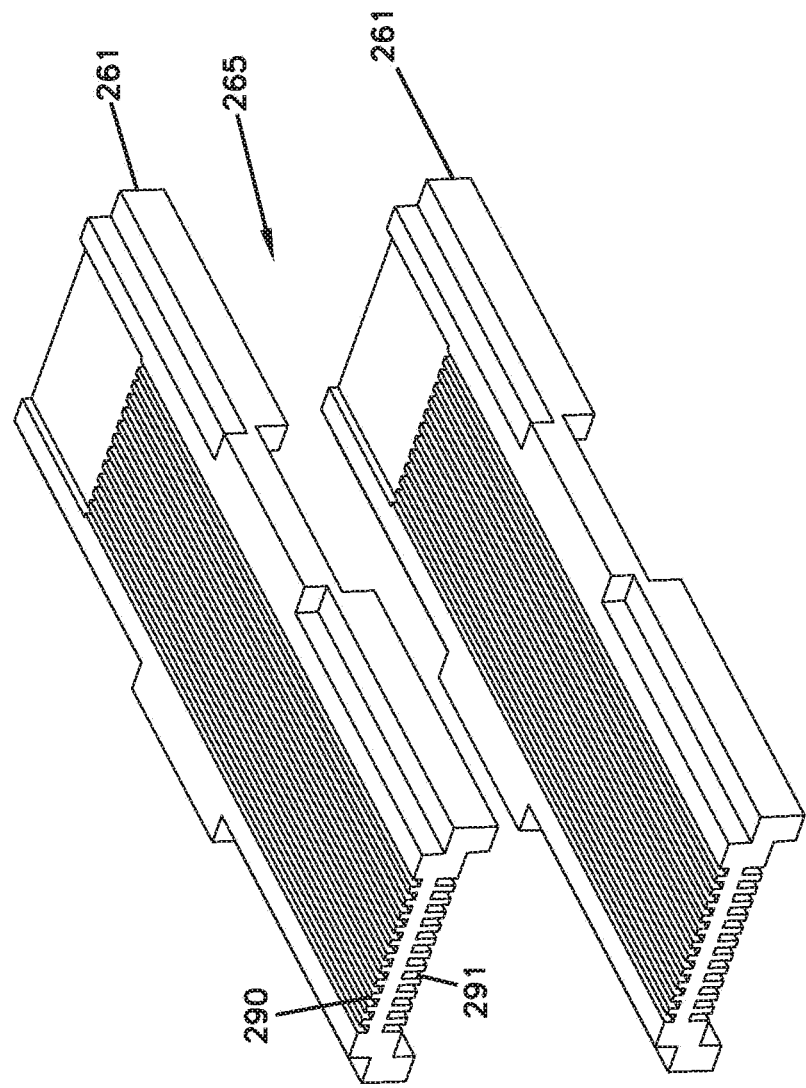
FIGS. 23-26 are further views showing fiber management trays of the tray stack of FIG. 22.
Figure 24:
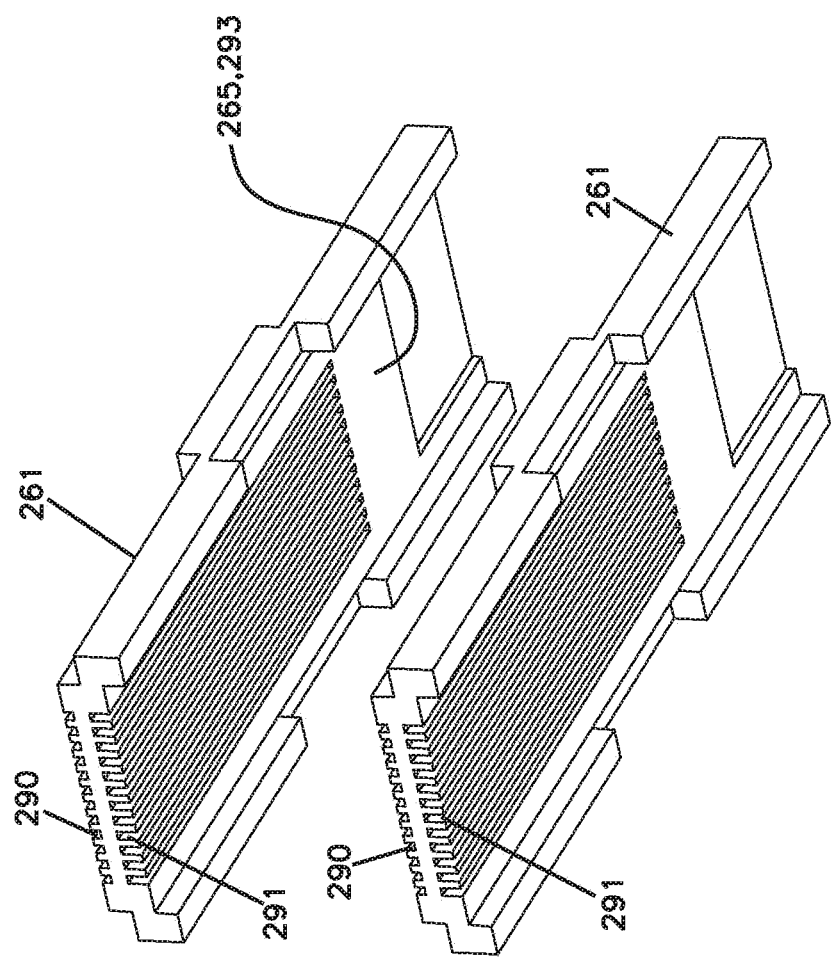
Figure 25:
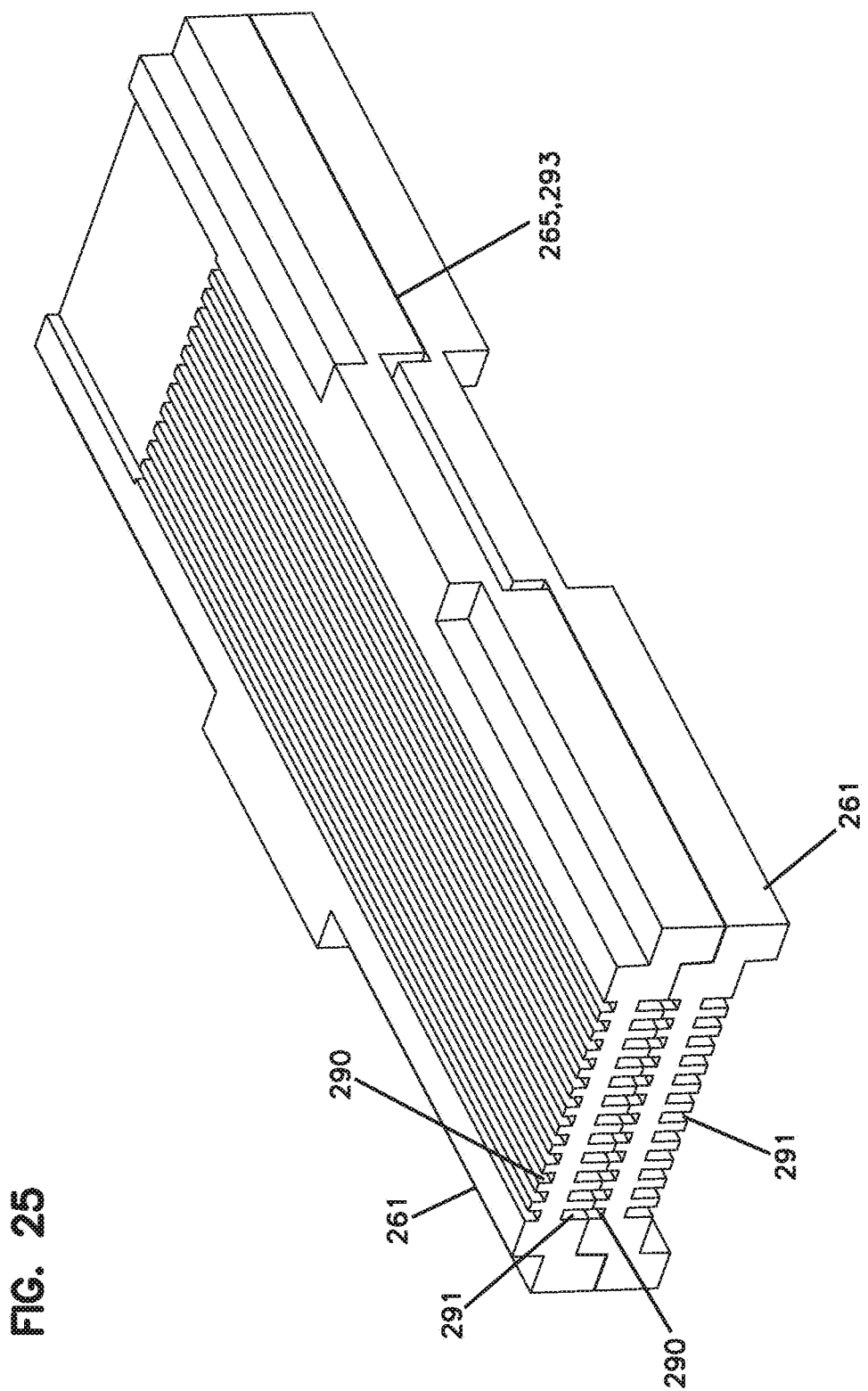
Figure 26:
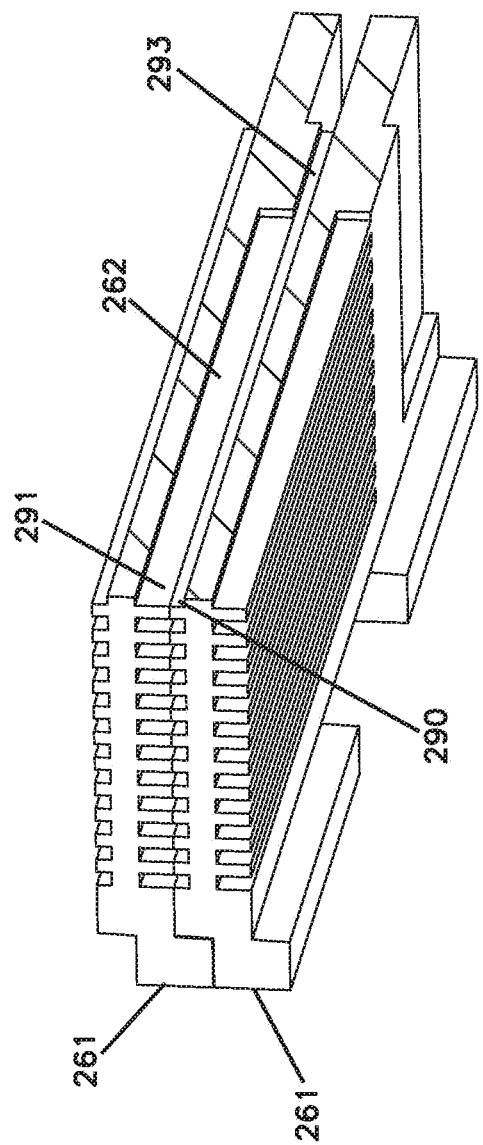

In certain examples, the fiber alignment feature 271 can include rows of cantilevers 280 for biasing the fiber end portions into the v-grooves 295 (see FIGS. 20 and 21). In certain examples, one cantilever 280 is provided for every two of the v-grooves 295. The cantilevers 280 can be part of a biasing layer 296 that includes two sets of cantilevers 280 with one set of cantilevers 280a corresponding to the fibers of one of the fiber optic connectors received within the fiber optic adapter and the other set of cantilevers 280b corresponding to the other fiber optic connector received within the fiber optic adapter. The biasing layers 296 can be formed by stamping the cantilevers 280 from plates. The biasing layers 296 can be provided between the fiber alignment trays 272 of the alignment tray stack.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A fiber optic connection system comprising:
   first and second fiber optic connectors each including:
      a connector body having a front end and an opposite rear end, the connector body defining a longitudinal axis that extends through the connector body in an orientation that extends from the front end to the rear end of the connector body;
      an optical fiber that extends through the connector body from the rear end to the front end, the optical fiber having a fiber end accessible at the front end of the connector body; and
      a nose piece mounted at the front end of the connector body, the nose piece defining a fiber passage through which the optical fiber extends, the nose piece being movable along the longitudinal axis between an extended position where a front end portion of the optical fiber is protected within the fiber passage and a retracted position where the front end portion of the optical fiber projects forwardly beyond the nose piece; and
   an adapter for coupling the first and second fiber optic connectors together such that optical signals can be conveyed between the optical fibers of the first and second fiber optic connectors, wherein the adapter includes opposite first and second adapter ports for respectively receiving the first and second fiber optic connectors, the adapter having an alignment passage for receiving and co-axially aligning the front end portions of the optical fibers;
   wherein the alignment passage is defined by a fiber alignment structure of the adapter, the fiber alignment structure including first and second opposite ends oriented transverse to a longitudinal axis of the alignment passage;
   wherein the nose pieces of the first and second fiber optic connectors respectively abut against the first and second ends of the fiber alignment structure when the first and second fiber optic connectors are inserted into the first and second adapter ports; and
   wherein the adapter includes alignment projections that fit within corresponding alignment openings defined by a front face of the connector body when the first and second fiber optic connectors are respectively inserted into the first and second adapter ports.

2. The fiber optic connection system of claim 1, wherein the fiber passages of the nose pieces co-axially align with the alignment passage of the adapter to assist in guiding the front end portions of the optical fibers into the alignment passage.

3. The fiber optic connection system of claim 1, wherein the alignment passage is defined by an open-sided groove, and wherein the adapter includes resilient structures for biasing the front end portions of the optical fibers into the open-sided groove.

4. The fiber optic connection system of claim 3, wherein the resilient structures are beams.

5. The fiber optic connection system of claim 1, wherein, when the adapter and the first and second fiber optic connectors are coupled together, the first and second opposite ends of the fiber alignment structure fit inside an opening of the connector body that contains the nose pieces.

6. The fiber optic connection system of claim 5, wherein the first and second ends of the fiber alignment structure have a complementary matching shape with the opening.

7. The fiber optic connection system of claim 5, wherein a cross-sectional area of the nose pieces have a complementary matching shape with the opening.

8. The fiber optic connector of claim 1, wherein each nose piece is spring biased toward the extended position, and wherein each nose piece retracts back into its respective connector body as the nose piece moves from the extended position toward the retracted position.

9. A fiber optic connector comprising:
a connector body having a front end and an opposite rear end, the connector body defining a longitudinal axis that extends through the connector body in an orientation that extends from the front end to the rear end of the connector body;
a stack of fiber management trays positioned within the connector body;
multiple rows of a plurality of optical fibers being positioned between the stack of fiber management trays, the stack of fiber management trays each including a fiber anchoring region for managing and anchoring the plurality of optical fibers relative to the connector body, the plurality of optical fibers extending through the connector body from the rear end to the front end, the plurality of optical fibers each having a fiber end accessible at the front end of the connector body; and
a nose piece mounted at the front end of the connector body, the nose piece including multiple rows of a plurality of fiber passages through which the plurality of optical fibers extend, the nose piece being movable along the longitudinal axis between an extended position where front end portions of the plurality of optical fibers in each of the multiple rows are protected within the plurality of fiber passages and a retracted position where the front end portions of the plurality of optical fibers in each of the multiple rows project forwardly beyond the nose piece; wherein the nose piece moves along the longitudinal axis relative to the stack of fiber management trays.

10. The fiber optic connector of claim 9, wherein the nose piece is spring biased toward the extended position, and wherein the nose piece retracts back into the connector body as the nose piece moves from the extended position toward the retracted position.

11. The fiber optic connector of claim 9, wherein each front end portion of the plurality of optical fibers is a bare glass portion that does not have a ferrule secured thereto.

12. The fiber optic connector of claim 9, wherein the stack of fiber management trays each include a first side defining a plurality of parallel shallow grooves and an opposite second side defining a plurality of deeper grooves.

13. The fiber optic connector of claim 12, wherein the first and second sides of adjacent fiber management trays oppose one another and interlock with one another to provide mechanical registration between the stack of fiber management trays.

14. The fiber optic connector of claim 9, wherein the stack of fiber management trays each define separate fiber buckling passages corresponding to each of the plurality of optical fibers, wherein the fiber buckling passages are positioned between the fiber anchoring region and the plurality of passages in the nose piece for receiving the front end portions of the plurality of optical fibers.

15. An optical fiber alignment device comprising:
a plurality of fiber alignment trays each defining an array of alignment grooves for receiving optical fibers; and
a plurality of biasing devices each including a frame with a plurality of beams for biasing the optical fibers into the array of alignment grooves;
wherein the plurality of biasing devices are configured to nest within the plurality of fiber alignment trays to provide a stack of fiber alignment trays and biasing devices that form the optical fiber alignment device, the plurality of biasing devices being positioned between the plurality of fiber alignment trays for aligning the array of alignment grooves with the plurality of beams.

16. The optical fiber alignment device of claim 15, wherein, when the biasing devices are nested within the fiber alignment trays, the array of alignment grooves extend beyond the frames of the plurality of biasing devices.

17. The optical fiber alignment device of claim 15, wherein the plurality of beams are independently flexible beams, each of the beams having at least one end fixed relative to the frame.

18. The optical fiber alignment device of claim 15, wherein the plurality of beams are separated into independent elastic beams by slots.

19. The optical fiber alignment device of claim 18, wherein top and bottom sides of adjacent fiber alignment trays oppose one another and interlock with one another to provide mechanical registration therebetween.

20. A fiber optic connection system comprising:
first and second fiber optic connectors each including:
a connector body having a front end and an opposite rear end, the connector body defining a longitudinal axis that extends through the connector body in an orientation that extends from the front end to the rear end of the connector body;
an optical fiber that extends through the connector body from the rear end to the front end, the optical fiber having a fiber end accessible at the front end of the connector body; and
a nose piece mounted at the front end of the connector body, the nose piece defining a fiber passage through which the optical fiber extends, the nose piece being movable along the longitudinal axis between an extended position where a front end portion of the optical fiber is protected within the fiber passage and a retracted position where the front end portion of the optical fiber projects forwardly beyond the nose piece; and
an adapter for coupling the first and second fiber optic connectors together such that optical signals can be conveyed between the optical fibers of the first and second fiber optic connectors, wherein the adapter includes opposite first and second adapter ports for respectively receiving the first and second fiber optic connectors, the adapter having an alignment passage for receiving and co-axially aligning the front end portions of the optical fibers;

wherein the alignment passage is defined by a fiber alignment structure of the adapter, the fiber alignment structure including first and second opposite ends oriented transverse to a longitudinal axis of the alignment passage;

wherein the nose pieces of the first and second fiber optic connectors respectively abut against the first and second ends of the fiber alignment structure when the first and second fiber optic connectors are inserted into the first and second adapter ports; and wherein the alignment passage is defined by an open-sided groove, and wherein the adapter includes resilient structures for biasing the front end portions of the optical fibers into the open-sided groove.

* * * * *